(12) United States Patent
Hall et al.

(10) Patent No.: US 9,643,656 B1
(45) Date of Patent: May 9, 2017

(54) VEHICLE ENERGY STORAGE SYSTEM

(71) Applicants: David R. Hall, Provo, UT (US);
Stephen R. Hall, Draper, UT (US);
Christopher Johnson, Provo, UT (US);
Jason Simpson, Provo, UT (US)

(72) Inventors: David R. Hall, Provo, UT (US);
Stephen R. Hall, Draper, UT (US);
Christopher Johnson, Provo, UT (US);
Jason Simpson, Provo, UT (US)

( * ) Notice: Subject to any disclaimer, the term of this patent is extended or adjusted under 35 U.S.C. 154(b) by 0 days.

(21) Appl. No.: 15/258,442

(22) Filed: Sep. 7, 2016

(51) Int. Cl.
*B60K 1/04* (2006.01)
*B62D 25/12* (2006.01)
*B60L 11/18* (2006.01)

(52) U.S. Cl.
CPC ............... *B62D 25/12* (2013.01); *B60K 1/04* (2013.01); *B60L 11/1879* (2013.01); *B60K 2001/0411* (2013.01); *B60K 2001/0494* (2013.01)

(58) Field of Classification Search
CPC ... B60K 1/00; B60K 1/02; B60K 1/04; B60K 1/08
See application file for complete search history.

(56) References Cited

U.S. PATENT DOCUMENTS

2005/0255377 A1* 11/2005 Kondo ................ B66F 9/07536
429/100

* cited by examiner

*Primary Examiner* — John Walters
*Assistant Examiner* — James Triggs

(57) ABSTRACT

A vehicle energy storage system is disclosed herein that addresses at least some of the issues described above. The system includes an energy storage compartment with an access mechanism. Safety mechanisms are provided that ensure energy cartridges are properly installed in the compartment, that the access mechanism properly closes, and that notify a user when the cartridges are improperly installed and/or are faulty.

20 Claims, 23 Drawing Sheets

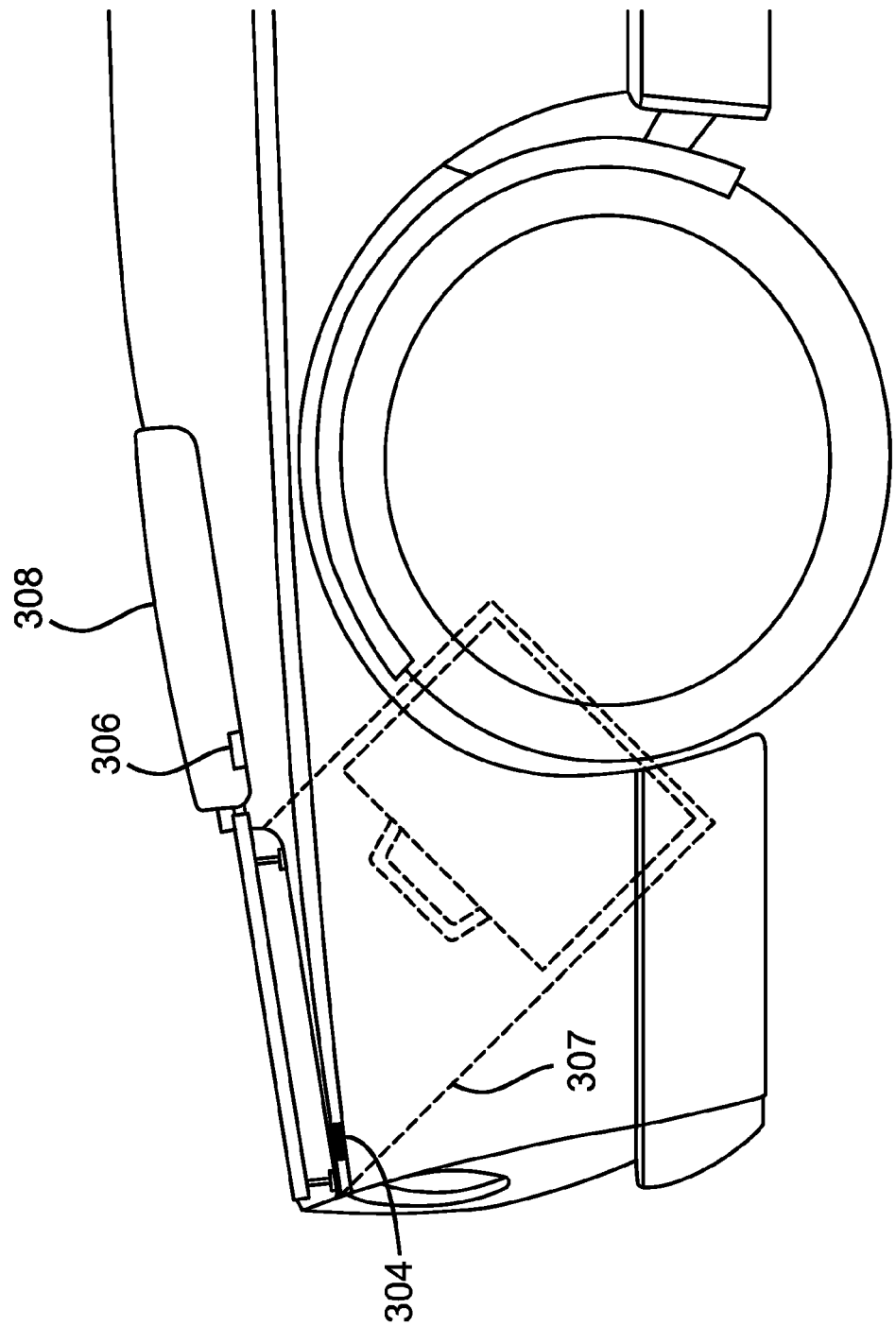

VEHICLE ENERGY STORAGE SYSTEM

TECHNICAL FIELD

This invention relates generally to the field of vehicle energy storage systems and more specifically to vehicle energy storage safety and check systems.

BACKGROUND

The advent of non-combustion, electric motor vehicles has brought on a new set of design and engineering challenges not experienced with traditional combustion-powered vehicles. For example, refueling electric motor vehicles cannot be accomplished in the same ways. Instead of having gas tanks, which can be filled and drained limitlessly, many electric vehicles have energy storage cells that have to be recharged. A common solution presented, for example, for battery-powered electric vehicles is plug-and-wait. However, this is incredibly inconvenient for individuals who drive for long periods, such as on road trips, or for delivery vehicles that lose precious time that could be spent making deliveries.

One solution presented by Hall, et al. in patent application Ser. No. 15/220,890 is to have replaceable energy storage cartridges that can be exchanged through a co-op system. This allows an individual to "refuel" an electric vehicle without, for example, waiting for their batteries to recharge. Other current solutions suggest a similar system, where the batteries are disposed under the hood of the vehicle where the engine would normally be. However, this makes it appear as if the individual is working on the vehicle, or that the vehicle is broken-down, and can, for the individual, lead to many awkward conversations with strangers asking what their car trouble is. Other unresolved issues relate to the frequency with which an individual would have to access the energy storage compartment, and ensuring that the vehicle operates safely. Thus, there is ample room for improvement and the introduction of new solutions.

SUMMARY OF THE INVENTION

In general, a vehicle energy storage system is disclosed herein that addresses at least some of the issues described above. The system includes an energy storage compartment with an access mechanism. Safety mechanisms are provided that ensure energy cartridges are properly installed in the compartment, that the access mechanism properly closes, and that notify a user when the cartridges are improperly installed and/or are faulty. The claimed invention addresses the problems described above in the Background in a number of ways. First, one embodiment of the claimed access mechanism includes a sliding panel. This provides for a sleek design that, importantly, does not give the "hood-up" signal that the vehicle is broken-down. It is also more convenient to use. Second, the safety mechanisms ensure that the vehicle is operated safely and prevents damage to the energy storage cartridges and the vehicle. Third, the system provides useful information to the user about the energy storage cartridges.

One aspect of the claimed invention is a vehicle energy storage system having an energy storage compartment, a compartment access mechanism, an access securing mechanism, and an insertion check and securing prevention mechanism. The energy storage compartment is disposed in the vehicle and houses a number of energy storage cartridges. The compartment access mechanism at least partially encloses the compartment within the vehicle. The access securing mechanism secures the compartment access mechanism closed, thereby enclosing the energy storage compartment completely within the vehicle. The insertion check and securing prevention mechanism prevents the securing mechanism from securing the access mechanism closed when fewer than the number of cartridges are correctly, completely, or correctly and completely inserted. However, the insertion check and securing prevention mechanism also allows the securing mechanism to secure the access mechanism when the number of energy cartridges are correctly and completely inserted into the compartment.

Another aspect of the claimed invention is an energy storage system having an energy storage compartment, a compartment access mechanism, an access securing mechanism, and an access secure check and vehicle operation prevention mechanism. The energy storage compartment is disposed in the vehicle and houses a number of energy storage cartridges. The compartment access mechanism at least partially encloses the compartment within the vehicle. The access securing mechanism secures the compartment access mechanism closed, thereby enclosing the energy storage compartment completely within the vehicle. The access secure check and vehicle operation prevention mechanism prevents a user from operating the vehicle when the securing mechanism incompletely, incorrectly, or incompletely and incorrectly secures the access mechanism closed. However, the access secure check and vehicle operation prevention mechanism allows the user to operate the vehicle when the securing mechanism completely and correctly secures the access mechanism closed.

Yet another aspect of the claimed invention is an energy storage system having an energy storage compartment and a multi-cartridge system individual cartridge operability check mechanism. The energy storage compartment is disposed in the vehicle and houses a plurality of energy storage cartridges. The multi-cartridge system individual cartridge operability check mechanism indicates to a user at least one of the plurality of energy storage cartridges is incorrectly installed in the compartment, is inoperable, or both. Additionally, the multi-cartridge system individual cartridge operability check mechanism indicates to a user which of the plurality of energy storage cartridges is incorrectly installed, is inoperable, or is incorrectly installed and inoperable.

BRIEF DESCRIPTION OF THE DRAWINGS

A more particular description of the invention briefly described above is made below by reference to specific embodiments. Several embodiments are depicted in drawings included with this application, in which:

FIGS. 3A-E depict various views of an access securing mechanism and an insertion check and securing prevention mechanism, according to the claimed invention;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

Figure 1:
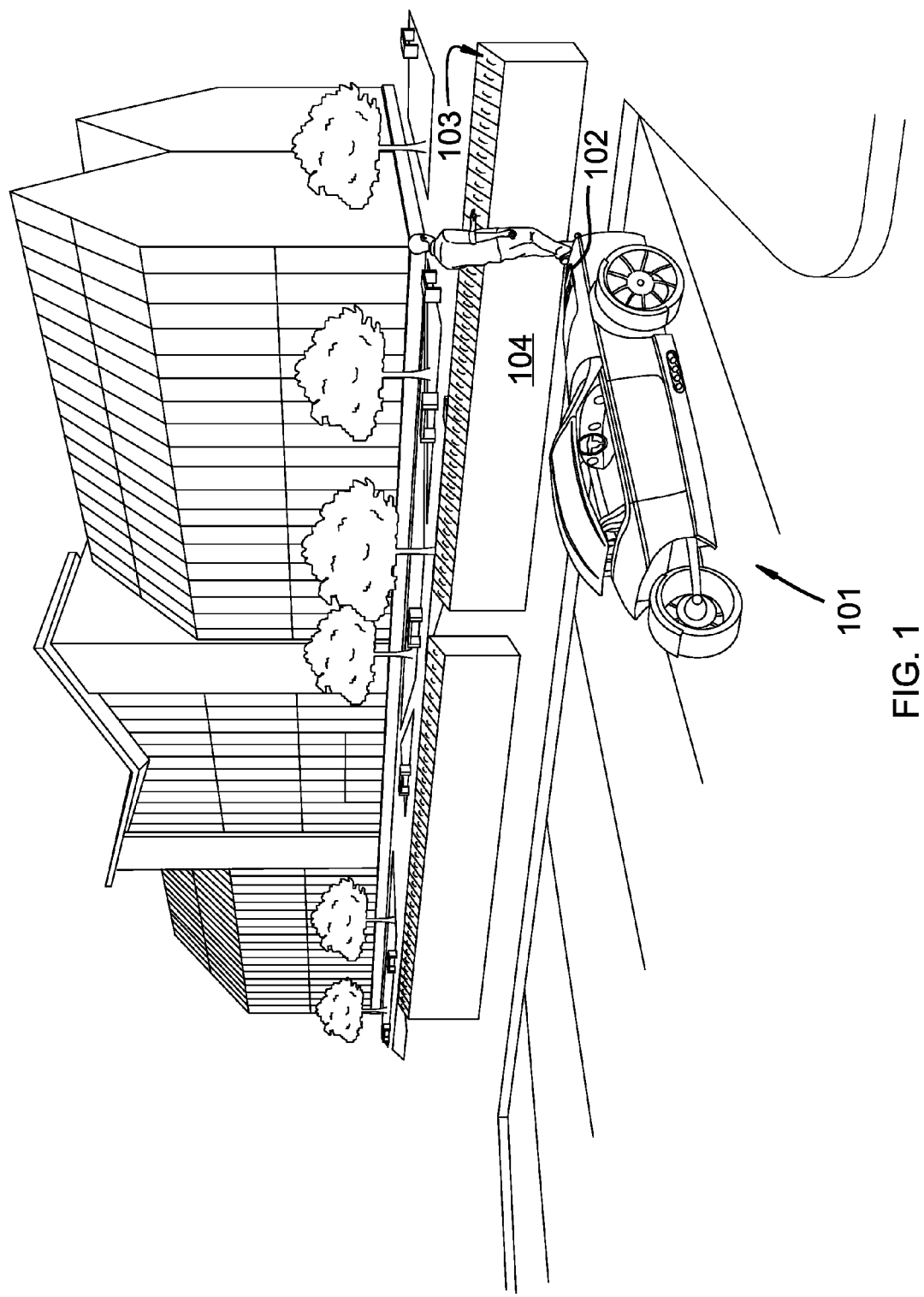
FIG. 1 depicts an energy storage cartridge exchange system.

FIG. 1 depicts an example of an energy storage cartridge exchange system. Vehicle 101 is an electric vehicle powered by batteries stored in battery storage compartment 102. Batteries 103 are exchangeable at kiosks 104 via a battery exchange co-op. Each battery 103 is associated with a co-op member, such as member 105, as the battery is exchanged. Batteries taken by a member are associated on a server with that member, and batteries returned by the member are associated with the kiosk location where the battery was returned. In some embodiments, a battery cannot be taken from a kiosk unless one is inserted. For example, in one embodiment, each kiosk stores a maximum of one less than a maximum battery capacity of the kiosk. A co-op member exchanges batteries by first inserting a depleted battery, then taking a charged battery, leaving a slot open for the next depleted battery, and so on. This leaves one slot in the kiosk always open for receiving depleted batteries first, and allows for incorporating security mechanisms that ensure members do not take more batteries than their car can store.

Though some embodiments described herein refer to the energy storage cartridge as a "battery," other types of energy storage cartridges are also envisioned. For example, in some embodiments, the energy storage cartridge is an exchangeable fuel cell, such as a hydrogen fuel cell. In other embodiments, the cartridges store a conventional fuel such as CNG, LNG, and LPG.

Figure 2A:
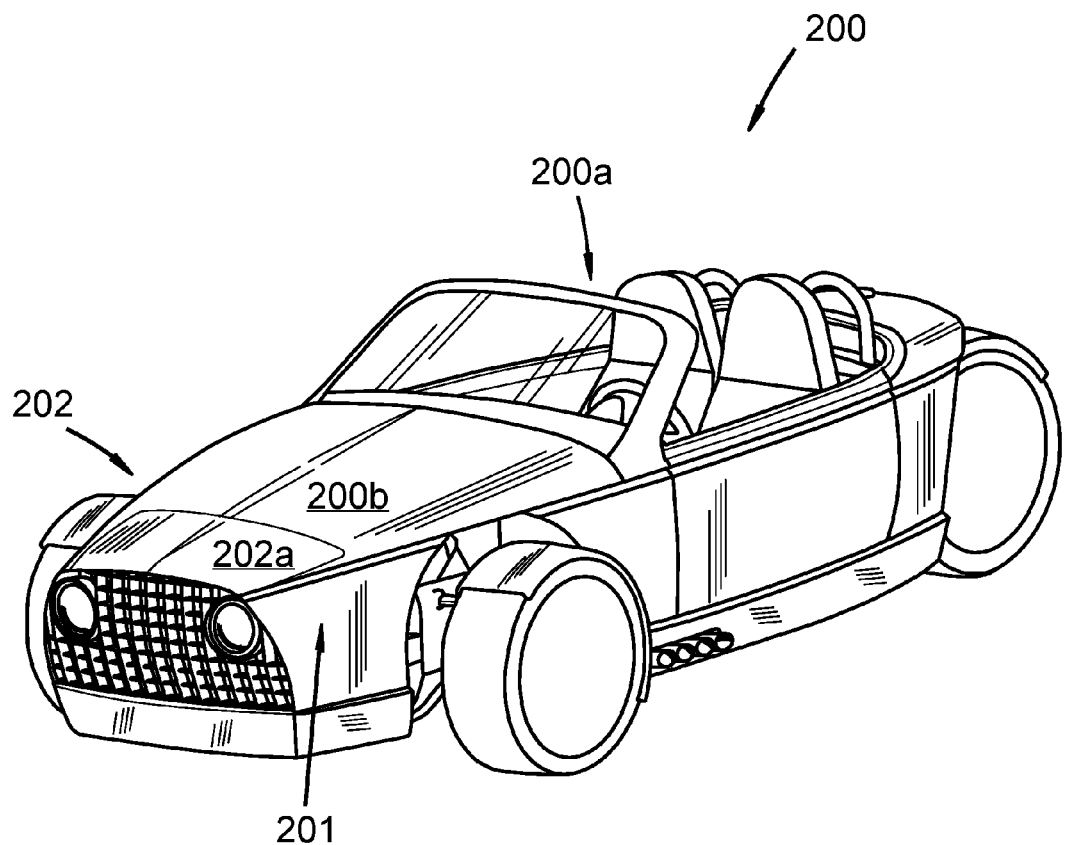
FIGS. 2A-D depict various views of a vehicle having an energy storage system in accordance with the claimed invention.
Figure 2B:
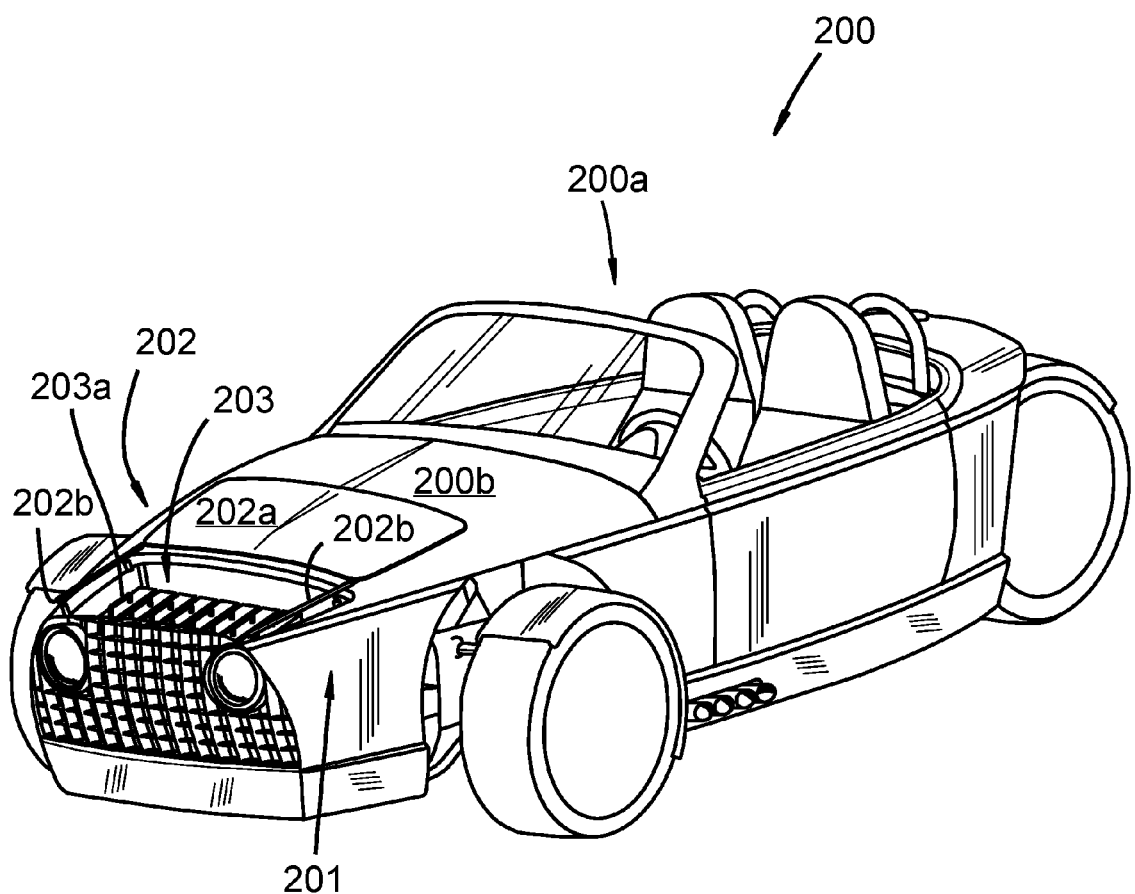
Figure 2C:
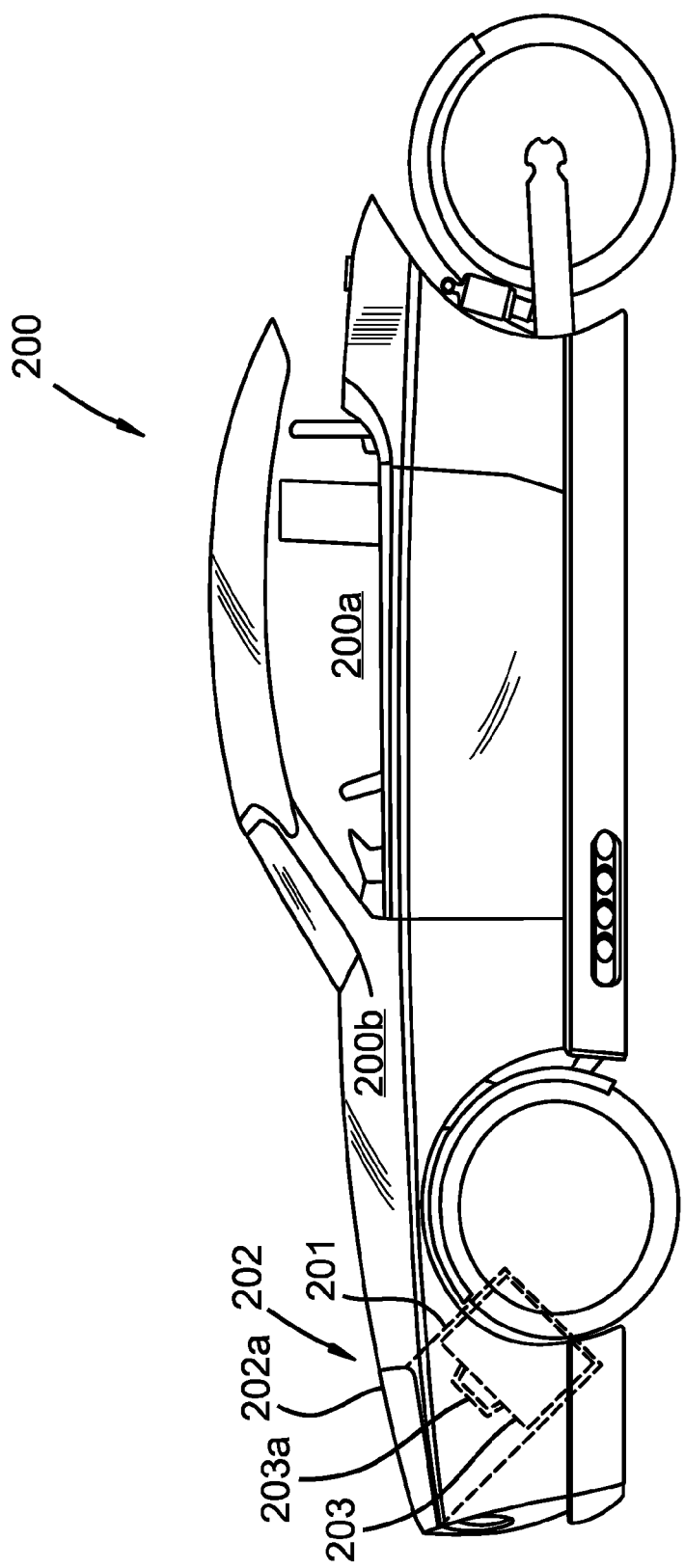
Figure 2D:
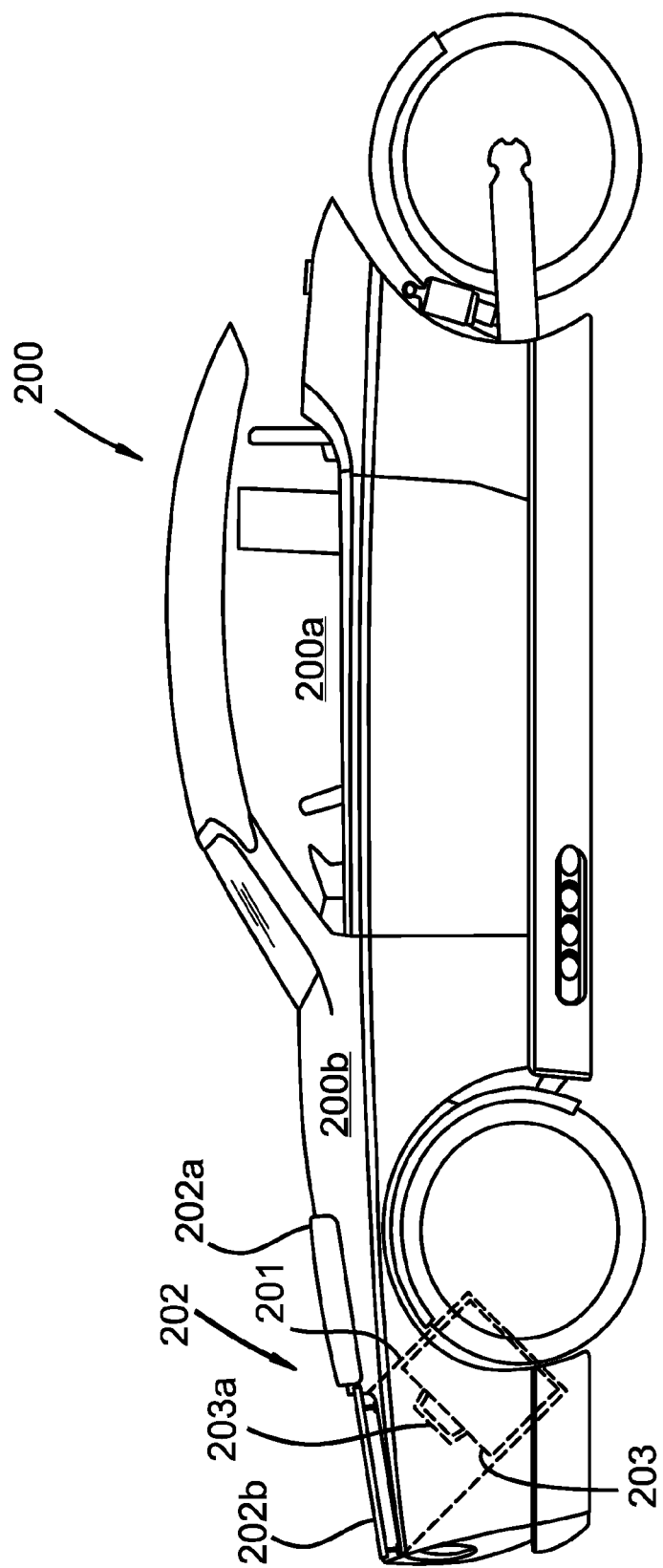

FIGS. 2A-D depict various views of a vehicle having an energy storage system in accordance with the claimed invention. As shown in FIG. 2A, vehicle 200 includes energy storage compartment 201 and compartment access mechanism 202, which at least partially encloses compartment 201 within vehicle 200. As shown in FIG. 2B, a number of energy storage cartridges 203 are housed within compartment 201. As shown in FIGS. 2C-D, compartment 201 is disposed in vehicle 200.

In some embodiments, the vehicle energy storage system depicted in FIGS. 2A-D additionally includes an access securing mechanism and an insertion check and securing prevention mechanism, examples of which are described in more detail below with regard to FIGS. 3-5. The access securing mechanism secures access mechanism 202 closed. The insertion check and securing prevention mechanism prevents the securing mechanism from securing access mechanism 202 closed when fewer than the total number of energy storage cartridges 203 equaling the capacity of compartment 201 are correctly inserted into compartment 201. Conversely, the insertion check and securing prevention mechanism allows the securing mechanism to secure the access mechanism closed when the total number of energy cartridges 203 are correctly and completely inserted into compartment 201. As used throughout, "correctly inserted" means having the correct orientation, being completely inserted, and properly mated with energy transfer mechanisms that transfer energy between energy storage cartridges 203 and vehicle 200.

In some embodiments, the vehicle energy storage system depicted in FIGS. 2A-D includes the access securing mechanism described above and an access secure check and vehicle operation prevention mechanism, examples of which are described in more detail below with regard to FIGS. 5A-F. The access secure check and vehicle operation prevention mechanism prevents a user from operating vehicle 200 when the securing mechanism incompletely, incorrectly, or incompletely and incorrectly secures access mechanism 202 closed. Conversely, the access secure check and vehicle operation prevention mechanism allows the user to operate vehicle 200 when the securing mechanism completely and correctly secures access mechanism 202 closed.

In yet other embodiments, the vehicle energy storage system depicted in FIGS. 2A-D includes a multi-cartridge system individual cartridge operability check mechanism, examples of which are described in more detail below with regard to FIGS. 6A-B. The multi-cartridge system individual cartridge operability check mechanism indicates to a user at least one of energy storage cartridges 203 is incorrectly installed in the compartment, is inoperable, or both. Additionally, the operability check mechanism indicates to the user which energy storage cartridge 203 is incorrectly installed, is inoperable, or both.

Vehicle 200 is any of a variety of vehicle types. As shown, vehicle 200 is a wheeled land-borne vehicle. However, in some embodiments, vehicle 200 is an air-borne vehicle, and in other embodiments, vehicle 200 is a water-borne vehicle. Similarly, though depicted as a three-wheeled vehicle, vehicle 200 is, in some embodiments, a four-wheeled vehicle, a two-wheeled vehicle, and/or a belt-driven vehicle such as a snowmobile. Vehicle 200's drive mechanism also includes propellers, jets, fans, turbines, and turbofans, among others. Furthermore, Vehicle 200 is powered by any of a variety of motors, such as a combustion engine, an electric motor, or combinations thereof such as hybrid motors.

Energy storage compartment 201 is designed and positioned in vehicle 200 in a variety of ways. In the depicted embodiment, energy storage compartment 201 is positioned in front of a passenger compartment 200a. However, in some embodiments, energy storage compartment 201 is positioned behind passenger compartment 200a. In other embodiments, energy storage compartment 201 is positioned beneath passenger compartment 200a.

Energy storage compartment 201 is designed to house energy storage cartridges 203, and is embodied in a variety of different designs. For example, in one embodiment, energy storage compartment 201 includes segmented slots having separate openings for each energy storage cartridge 203. In another embodiment, energy storage compartment 201 includes a floor and four walls, with grooves along two parallel walls and/or along the floor. Conversely, in one embodiment, the floor and walls are smooth, and energy storage compartment 203 includes magnetic tracks for each energy storage cartridge 203. In various embodiments, energy storage compartment 201 includes an opening through which a user accesses and exchanges energy storage cartridges 203, and which is closed off by access mechanism 202, thereby closing off access to energy storage compartment 201.

Though the names "floor" and "wall' indicate a specific orientation, it is understood by one of skill in the art that the floor and walls can be oriented in any of a variety of ways without departing from the substance of the disclosure. In general, it should be understood that the floor is positioned opposite the opening and intersecting the walls. Additionally, though some walls are described as parallel, it is understood that walls that are not parallel, or are only roughly parallel, can incorporate the described features without departing from the substance of the disclosure.

In some embodiments, energy storage compartment 201 includes electrical contacts for transmitting energy from the energy storage cartridges 203. In other embodiments, energy storage compartment 201 includes gas and/or liquid valve connects that connect to, and create a seal with, energy storage cartridges 203. Additionally, in some embodiments, energy storage compartment 201 incorporates safety features to compensate for failure of cartridges 203 and/or seals. For example, in one embodiment, compartment 201 includes an automated check valve. When a gas and/or liquid leak is detected, compartment 201 is filled with an inert gas such as $N_2$ to positive pressure, and the combustible gas/liquid is forced out of compartment 201. In such embodiments, a notification system is also included to notify a user of the leak. While one example is provided of a safety system, one of skill in the art recognizes other similar safety systems suitable for use with vehicle 200.

As shown, compartment 201 is depicted to conform to engineering and design features of a land-based vehicle. However, as described above, the vehicle energy storage system is useful for any land, sea and/or air vehicle. For example, in some air vehicle embodiments, such as a fixed-wing aircraft, compartment 201 is disposed in the fuselage. In other air vehicle embodiments, compartment 201 is disposed in a wing of the aircraft. In some rotary wing embodiments, compartment 201 is disposed above a passenger compartment or behind the passenger compartment between the passenger compartment and the tail rotor. In some water vehicle embodiments, compartment 201 is disposed inboard anywhere within the hull of the watercraft. In other water vehicle embodiments, compartment 201 is disposed in the watercraft on the deck of the watercraft.

Access mechanism 202 is any of a variety of mechanisms capable of directly controlling access to compartment 201 through compartment 201's opening. As depicted, access mechanism 202 includes vehicle body panel 202a and extension mechanisms 202b that extend body panel 202a away from compartment 201. However, any of a variety of configurations are suitable for access mechanism 202. For example, in some embodiments, access mechanism 202 is a set of sliding panels in vehicle body panel 200b corresponding to slots in compartment 201. In other embodiments, access mechanism 202 includes sets of split double-doors that open inwards as an energy storage cartridge 203 is pushed between the doors. In the same and/or other embodiments, the doors open outwards as an energy storage cartridge 203 is pulled between the doors out of compartment 201.

As depicted, body panel 202a extends away from compartment 201 over vehicle 200 parallel to body panel 200b and towards passenger compartment 200a. This overcomes the aesthetics problem described in the Background above, because the unique structure evokes a different aesthetic response from the "hood-up" aesthetic. Whereas the "hood-up" aesthetic causes an initial impression that a vehicle is broken, the sliding panel aesthetic is not associated with such situations. However, other embodiments also avoid the negative aesthetic. For example, in some embodiments, body panel 202a slides forwards and, in some cases, down over the front of vehicle 200. In other embodiments, it is simply sufficient that body panel 202a is smaller than a typical sedan or truck hood, but opens and closes in a similar manner to a typical sedan or truck hood. Thus, in some cases, body panel 202a actuates by a hinge.

Energy storage cartridges 203 store any of a variety of potential energy sources. For example, in one embodiment, cartridges 203 store potential energy in battery cells. In another embodiment, cartridges 203 store potential energy in hydrogen fuel cells. In yet another embodiment, cartridges 203 store potential energy in combustible liquid and/or gas form, such as CNG, LNG, and/or LPG. Additionally, cartridges 203 include one or more mechanisms for transferring the stored potential energy to vehicle 200. For example, in battery and hydrogen fuel cell embodiments, cartridges 203 include electrical contacts corresponding to electrical contacts in compartment 201. In liquid and/or gas embodiments, cartridges 203 include valves and/or interconnects corresponding to interconnects in compartment 201.

Cartridges 203 also include a variety of mechanisms and design features for handling. As shown, each cartridge 203 includes a handle 203 that a user grasps to remove depleted cartridges 203 from compartment 201 and return charged cartridges 203 to compartment 201. In some embodiments, each cartridge 203 includes one or more rubberized grips disposed in any of a variety of positions where a user grasps cartridges 203.

Figure 3A:
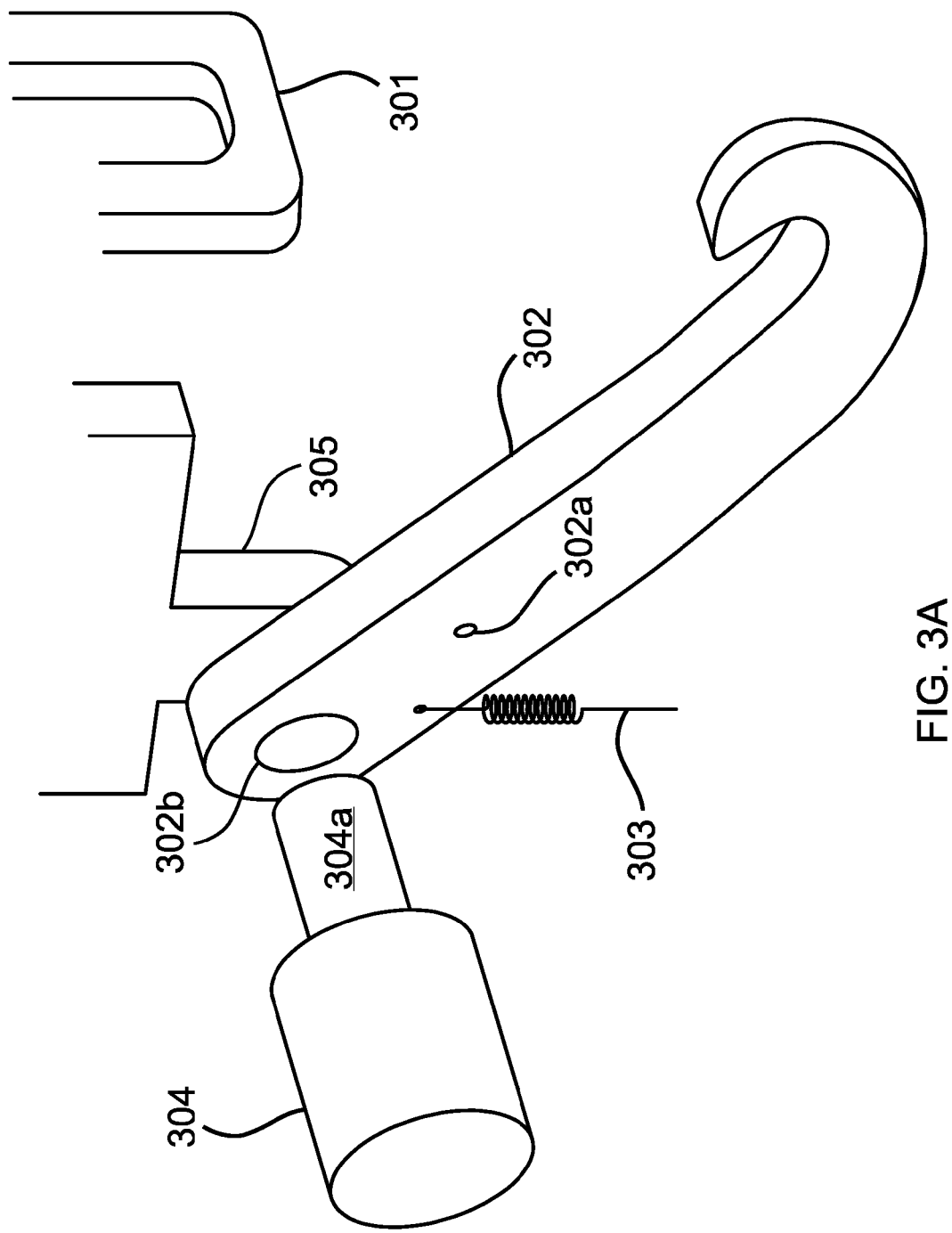
Figure 3B:
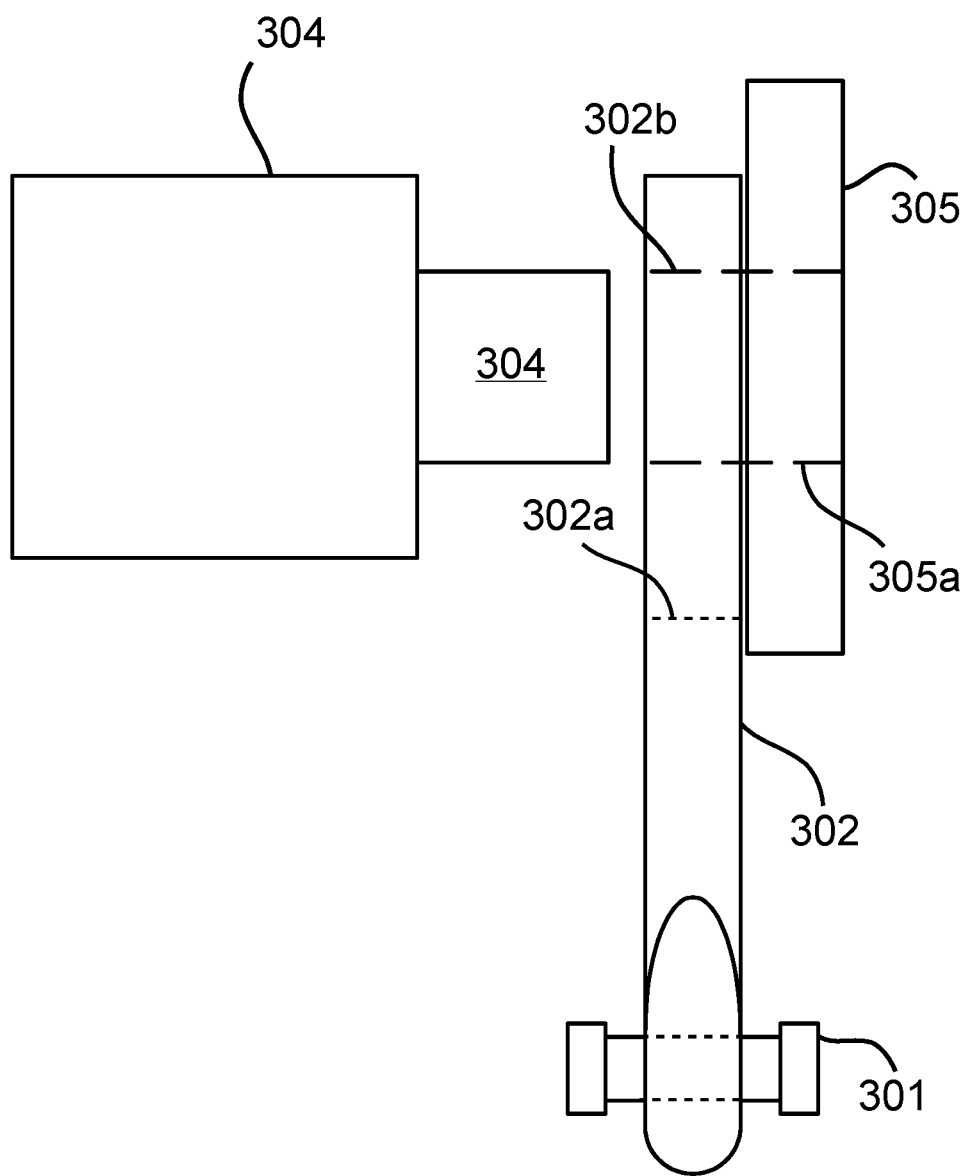

FIGS. 3A-E depict various views of an access securing mechanism and an insertion check and securing prevention mechanism, according to the claimed invention. The access securing mechanism is any of a variety of mechanisms that lock access mechanism 202 closed, enclosing compartment 201. For example, in some embodiments, the securing mechanism includes a latch. Such a latch is, in some embodiments, mechanical, in other embodiments, electromechanical, and in yet other embodiments, electromagnetic. FIGS. 3A-B depict isometric and top views of one embodiment of a hook-and-loop latch, according to the claimed invention. As depicted, the latch includes loop 301, hook 302, and spring 303. Loop 301 is coupled to an access mechanism, such as body panel 202a depicted in FIGS. 2A-D. Hook 302 is coupled to a vehicle component, such as a surface of an energy storage compartment similar to compartment 201 depicted in FIGS. 2A-D. Hook 302 is coupled to the vehicle component via pivot point 302a, about which hook 302 pivots.

The insertion check and securing prevention ("check") mechanism inspects the status of energy storage cartridges inserted into an energy storage compartment of a vehicle (each similar to that described above with regard to FIGS.

2A-D). If a cartridge is incompletely and/or incorrectly inserted into the compartment, the check mechanism prevents an access mechanism (similar to that described above with regard to FIGS. 2A-D) associated with the compartment from closing and thereby enclosing the compartment. For example, in a case where a user forgets to install a cartridge, the check mechanism will detect that at least one cartridge is incompletely inserted, and will prevent the access mechanism from closing. Similarly, in a case where a user has inserted a cartridge backwards, the check mechanism will detect that at least one cartridge is incorrectly inserted, and will prevent the access mechanism from closing. In both cases, the user is alerted by the failure of the access mechanism to close that a cartridge needs to be re-inserted or has been forgotten.

The check mechanism includes two stages: a first stage includes a mechanism that prevents the securing mechanism from securing the access mechanism closed, and a second stage includes a mechanism that allows the securing mechanism to secure the access mechanism closed. As depicted in FIGS. 3A-B, in some embodiments, the first stage includes electromagnet 304 and armature 304a, which together form a solenoid. The solenoid prevents the securing mechanism from securing the access mechanism by extending armature 304a through hole 302b in hook 302 and into hook lock 305. Hook lock 305 includes indentation 305a to receive armature 305a. In some cases, such as that depicted in FIG. 3B, indentation 305a passes completely through hook lock 305. As armature 304a holds hook 302 to hook lock 305, hook 302 cannot engage loop 301 coupled to the access mechanism, and thus the access mechanism cannot be secured. As electromagnet 304 is activated, armature 304a retracts from hole 302b, releasing hood 302, and allowing hook 302 to latch onto loop 301 and secure the access mechanism closed over the compartment.

In some embodiments, the hook-and-loop system depicted in FIGS. 3A-B includes another solenoid (not shown) that retracts hook 302 from loop 301. In some such embodiments, triggering of the hook-and-loop mechanism to release the access mechanism triggers the check mechanism to lock hook 302. For example, in one embodiment, pressing a button activates the hook-and-loop solenoid, which closes a circuit that activates the check mechanism solenoid. The embodiment also includes a delay circuit that delays triggering of the check mechanism solenoid until hole 302b is aligned between armature 304a and indentation 305a.

Figure 3C:
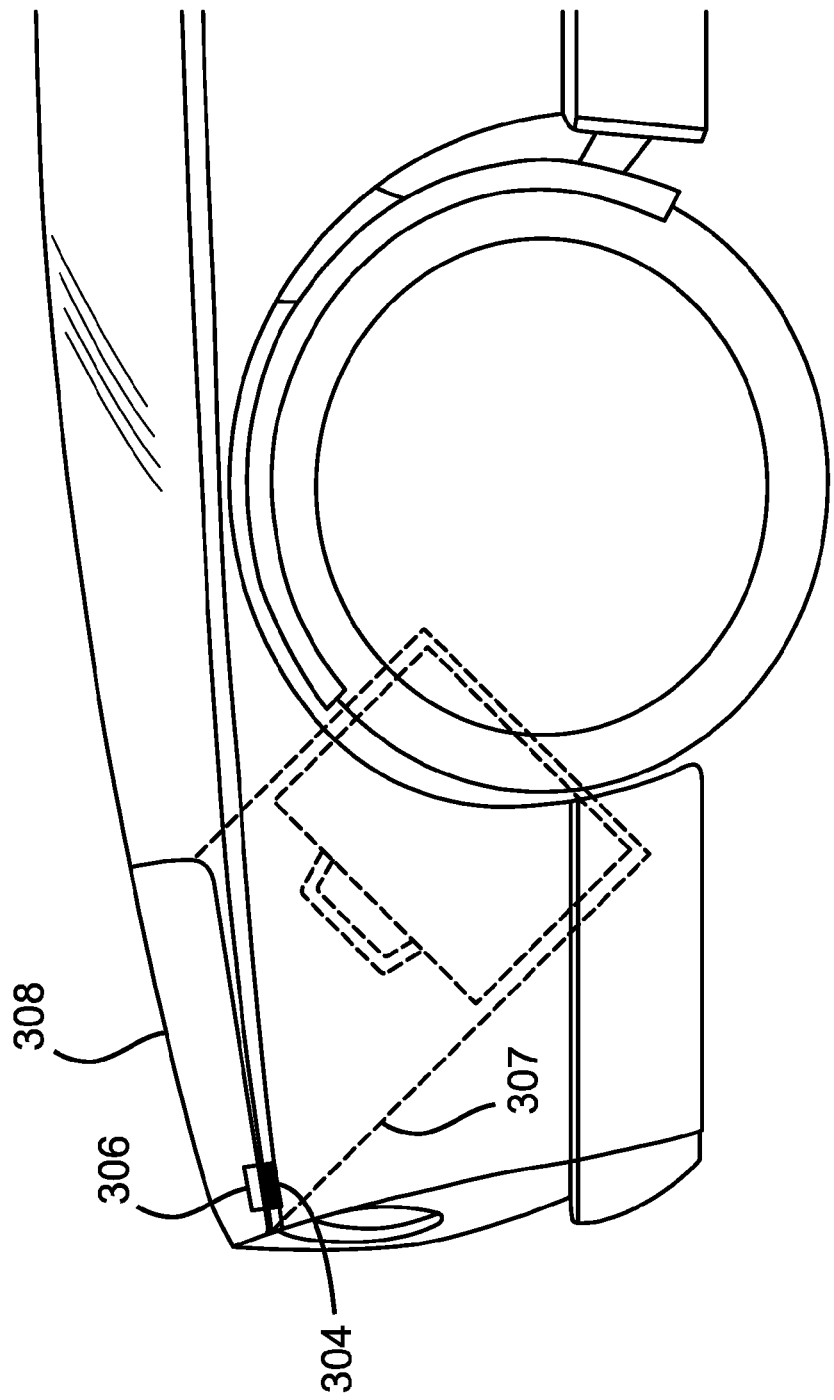

As depicted in FIGS. 3C-D, some embodiments of the first stage include electromagnet 304 and permanent magnet 306. Though only one of each is depicted, some embodiments include more than one electromagnet 304 and/or permanent magnet 306. As shown, electromagnet 304 is positioned inside compartment 307, and permanent magnet 306 is coupled to access mechanism 308. However, in some embodiments, electromagnet 304 is coupled to access mechanism 308, and permanent magnet 306 is positioned in compartment 307.

Figure 3E:
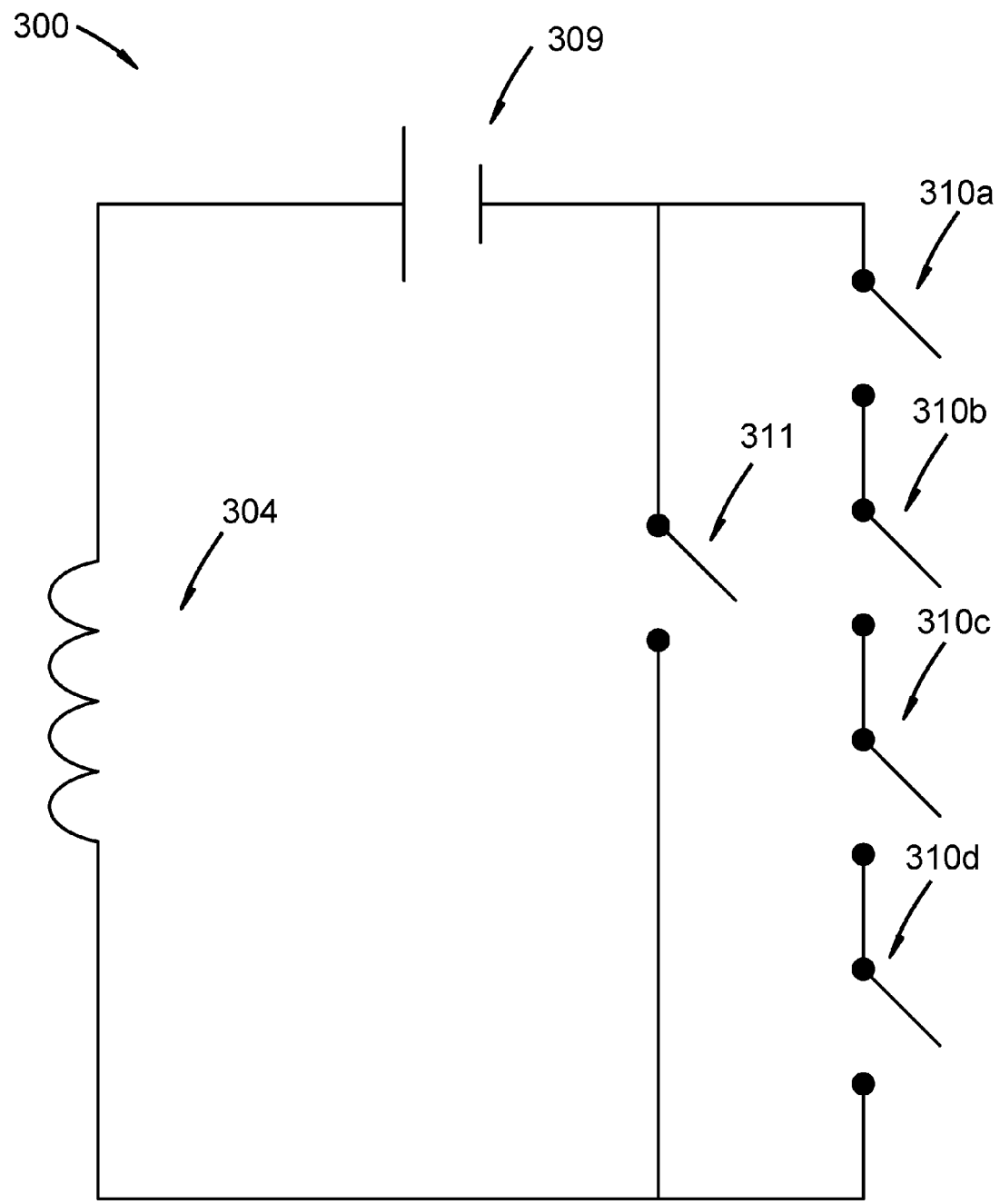

The second stage of the check mechanism includes, in some embodiments, a check mechanism circuit, such as that depicted in FIG. 3E. The check mechanism circuit includes independent battery 309, cartridge check switches 310a-d, and override switch 311. Though only four switches 310a-d are depicted, more or fewer switches 310 are incorporated in various embodiments. Battery 309 is independent of any other vehicle system, other than, in some embodiments, recharging from another vehicle system, such as batteries or an alternator. Each cartridge check switch 310a-d closes when a corresponding cartridge is completely and correctly inserted into the compartment. Electromagnet 304 does not receive any power from battery 309 until each switch 310a-d is closed. Thus, if all cartridges are inserted into the compartment, but a cartridge associated with switch 310b is incorrectly inserted, switches 310a,c,d are closed, but switch 310b remains open. In such a case, electromagnet 304 does not receive power and does not release the securing mechanism. Thus, the check mechanism circuit is completed and activates electromagnet 304 when the total number of cartridges the compartment houses is correctly and completely inserted into the compartment. As the circuit is completed, electromagnet 304 is activated by the check mechanism circuit, and releases the securing mechanism.

In one specific embodiment of the second stage, the compartment includes one or more electrical contacts, each of which corresponds to a cartridge, and each cartridge includes one or more complementary electrical contacts. In such an embodiment, correct and complete insertion of each cartridge into the compartment places the cartridge contacts in electrical contact with the compartment contacts. As the cartridge contacts form electrical contact with the compartment contacts, switches 310a-d close, supplying power to electromagnet 304. In some embodiments, the cartridge and compartment contacts act as switches 310a-d. In such embodiments, the electrical contact between the cartridge and compartment contacts closes one switch 310. For example, in one embodiment, battery 309 is directly electrically coupled to a first contact in the compartment. Each cartridge has a corresponding metallic strip that bridges between the first contact and a second contact in the compartment adjacent to the first contact. The second contact is directly electrically coupled to a third contact, which is adjacent to a fourth contact. The third and fourth contacts correspond to another cartridge and are bridged by a corresponding metallic strip on the second cartridge. This pattern of two contacts in the compartment bridged by a metallic strip in a corresponding cartridge and electrically coupled to neighboring sets of contacts in the compartment is repeated up to a maximum cartridge capacity of the compartment. The last contact in the compartment is directly electrically coupled to electromagnet 304.

In some embodiments of the second stage, the check mechanism electrical contacts are separate from power transfer electrical contacts in the cartridges and compartment for transferring energy to the vehicle. However, in some embodiments, the electrical contacts are the contacts for transferring energy to the vehicle from the cartridges. Some such embodiments include circuitry, such as diodes and/or capacitors, that tests the voltage of the output of each cartridge and prevents securing the access mechanism when one or more of the energy storage cartridges is defective.

In some embodiments of the second stage, such as the embodiment depicted in FIG. 3E, a check override mechanism is included. The check override mechanism allows the securing mechanism to secure the access mechanism closed when fewer than the total number of cartridges housed by the compartment are correctly completely inserted in the compartment. As shown, one embodiment is switch 311 wired in parallel to switches 310a-d. When a user closes switch 311, the insertion check and securing prevention mechanism is disabled so that the user can secure the access mechanism. This embodiment is useful, for example, in cases where a user is having maintenance performed on an energy storage cartridge and needs to close the access mechanism without inserting a replacement cartridge.

Figure 4A:
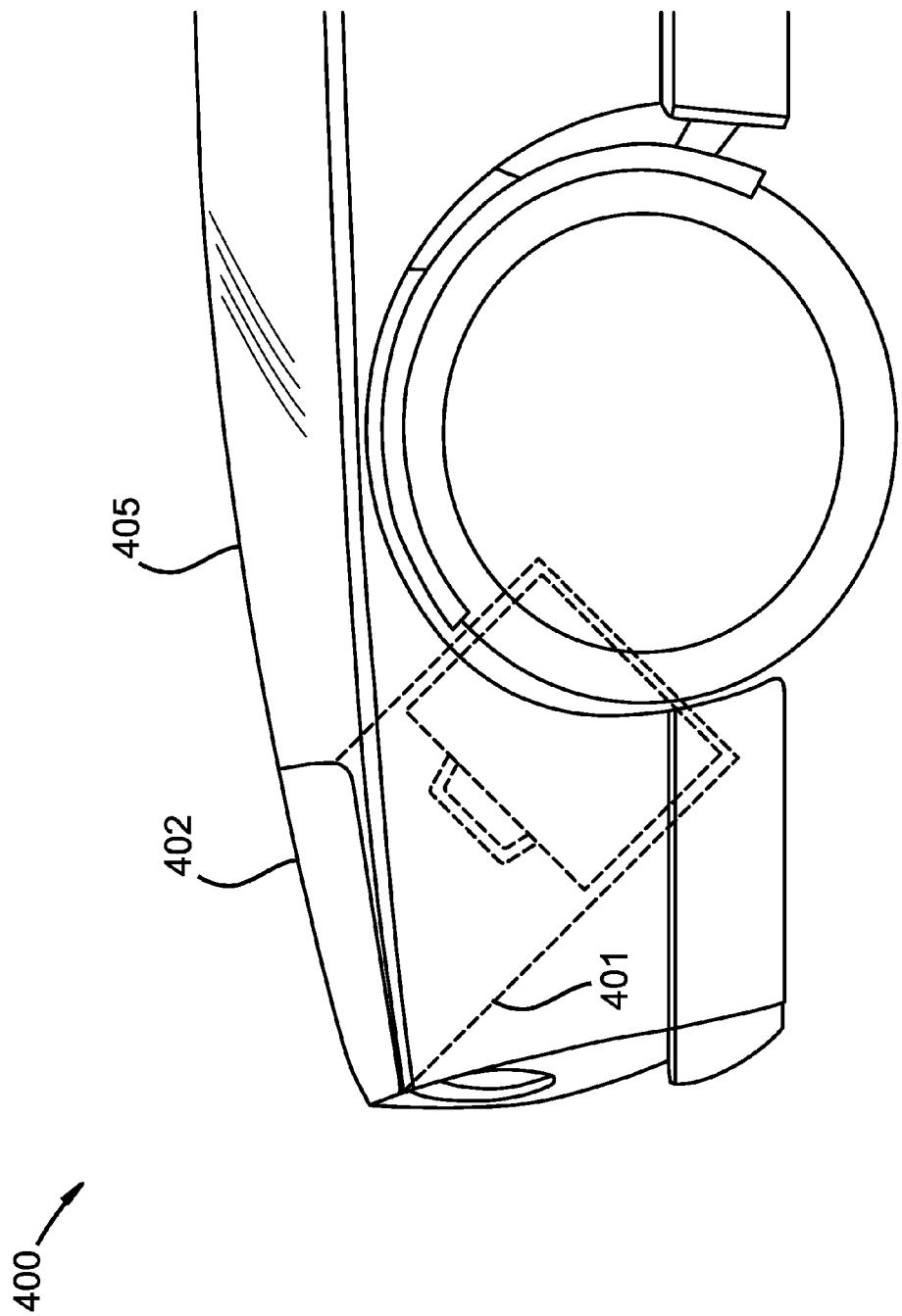
FIGS. 4A-E depict various views of a vehicle energy storage system according to the claimed invention.
Figure 4B:
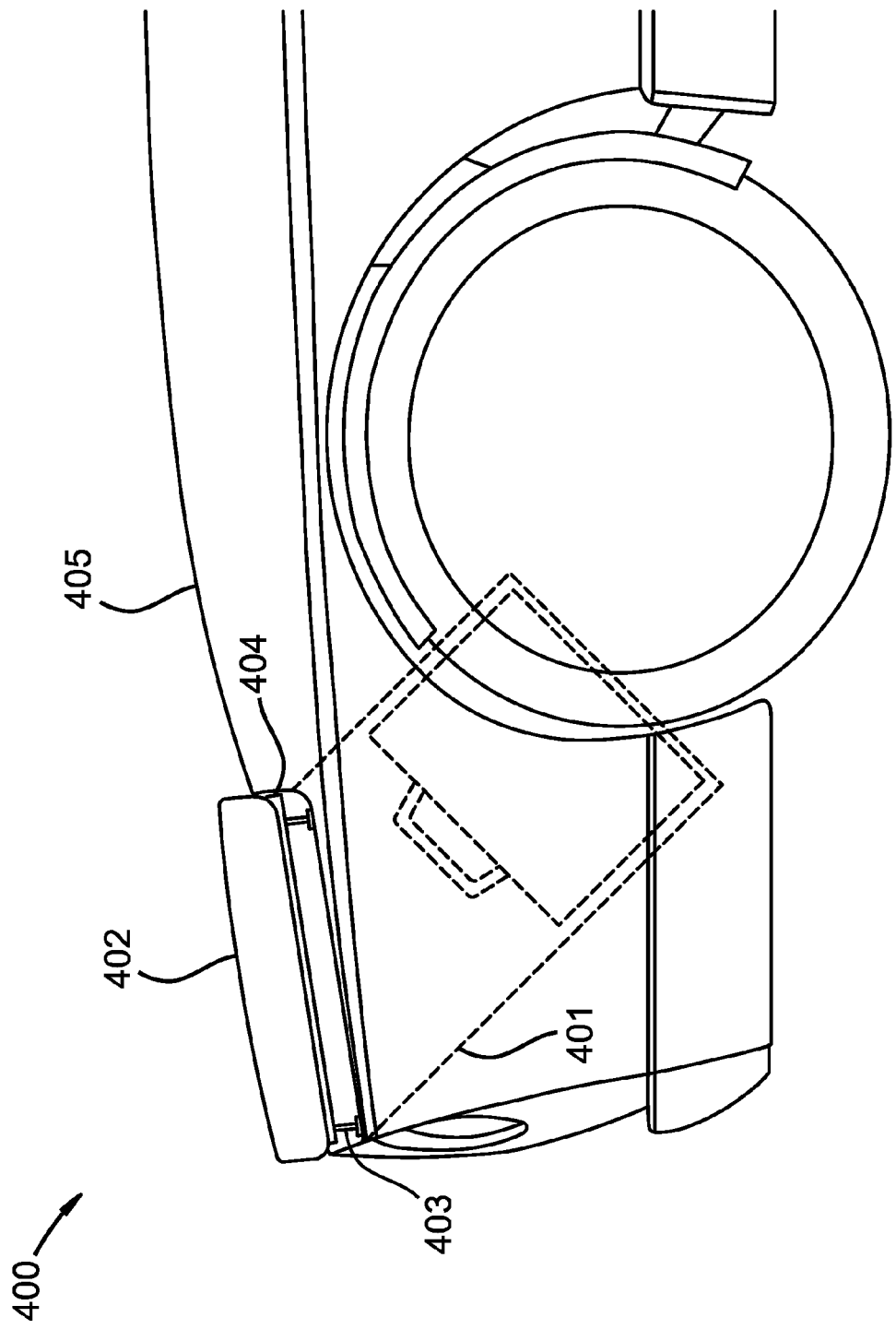
Figure 4C:
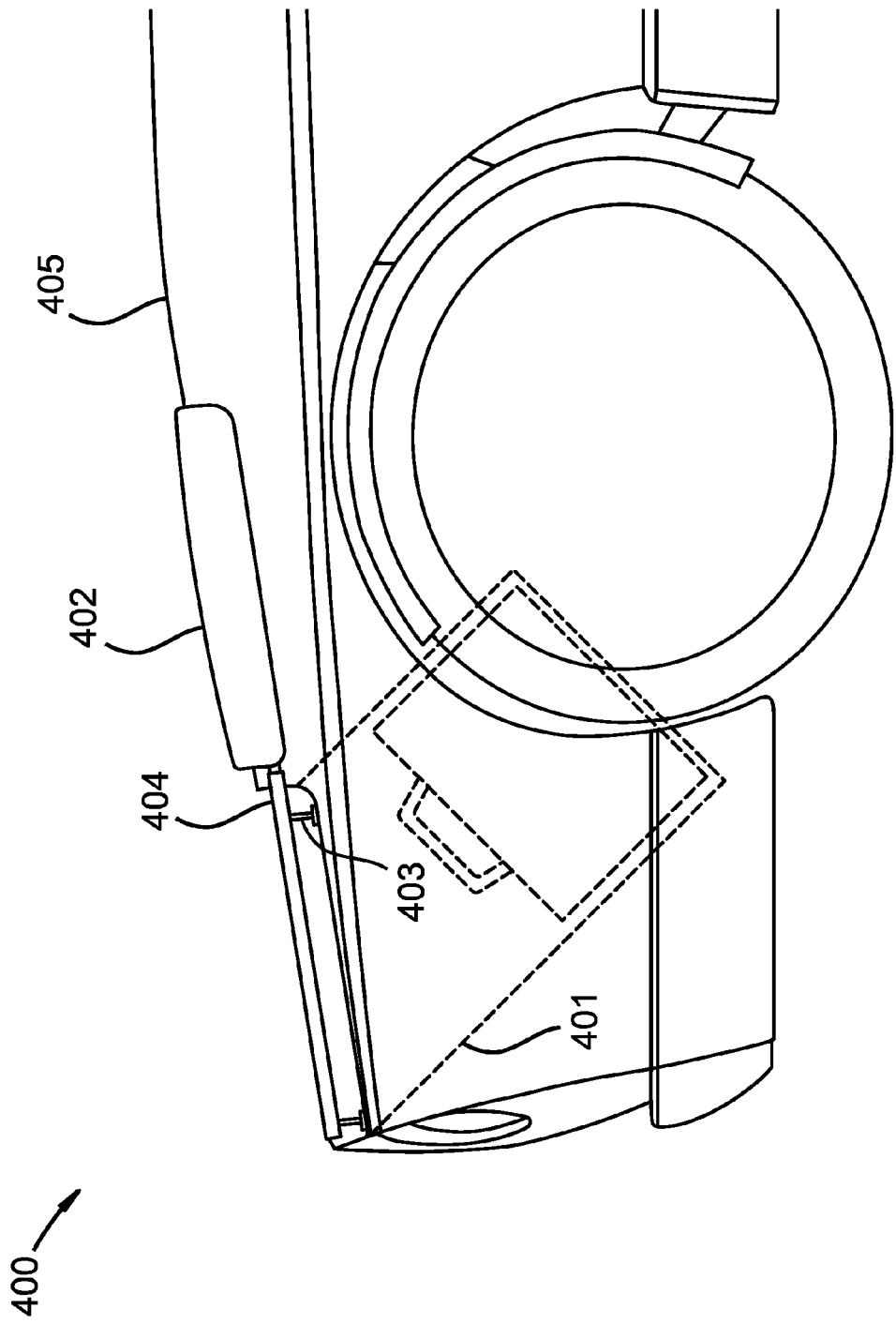
Figure 4D:
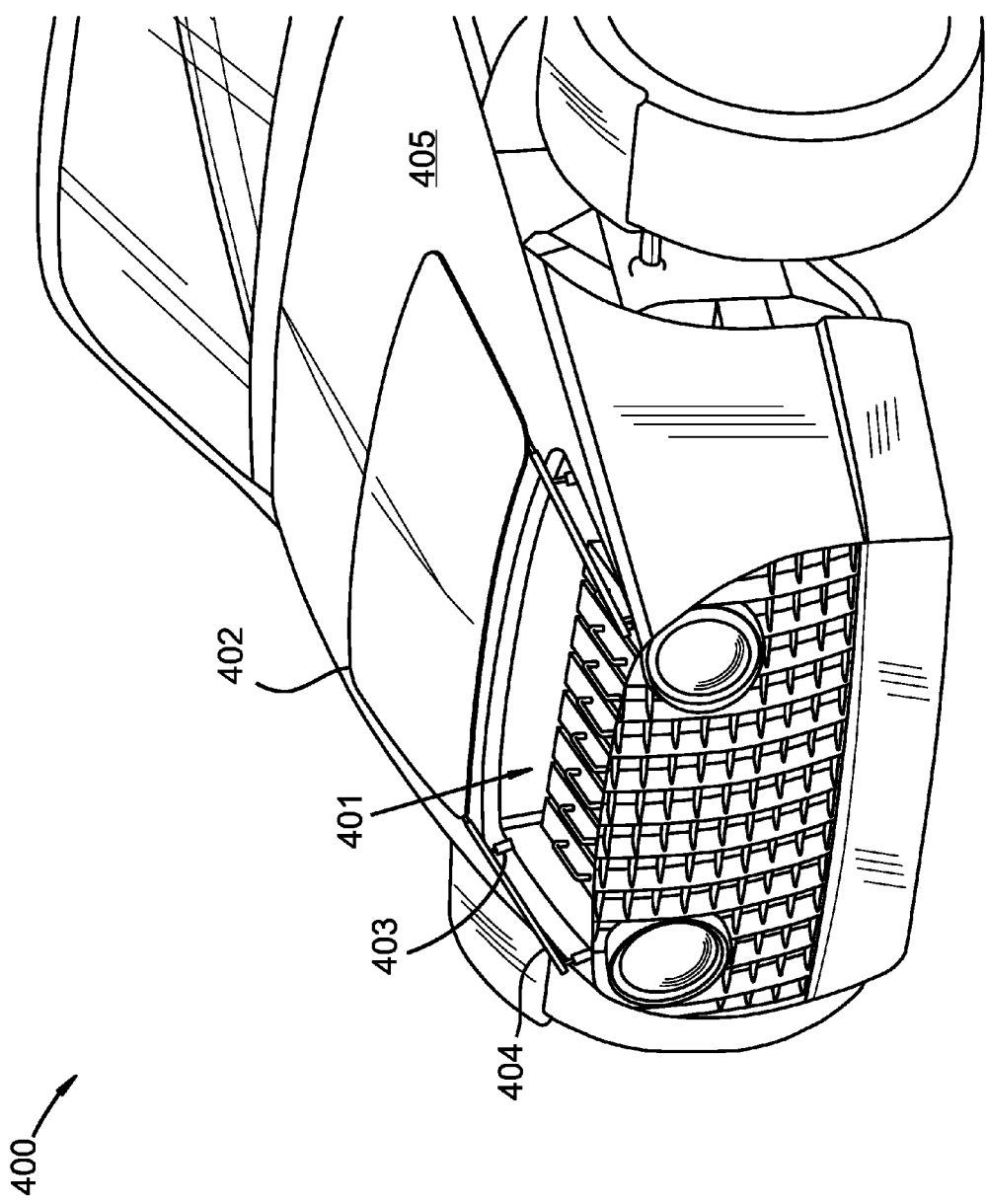

FIGS. 4A-E depict various views of a vehicle energy storage system according to the claimed invention. System 400 includes compartment 401, access mechanism 402, extendable mount 403, and extension mechanism 404. Extendable mount 403 mounts access mechanism 402 to the vehicle and extends access mechanism 402 above the plane of vehicle body panel 405, as shown in FIG. 4B. Extension mechanism 404 extends access mechanism 402 over vehicle body panel 405, as shown in FIG. 4C. Extendable mount 403 and extension mechanism 404 include springs, rollers hydraulic arms, pneumatic arms, electric cylinder arms, or combinations thereof. For example, in one embodiment, rollers are disposed between a first set of tracks coupled to access mechanism 402 and a second set of tracks coupled to the first set of tracks and the vehicle, such as via extendable mounts 403. Similar embodiments include actuating cylinders instead of rollers and tracks.

Figure 4E:
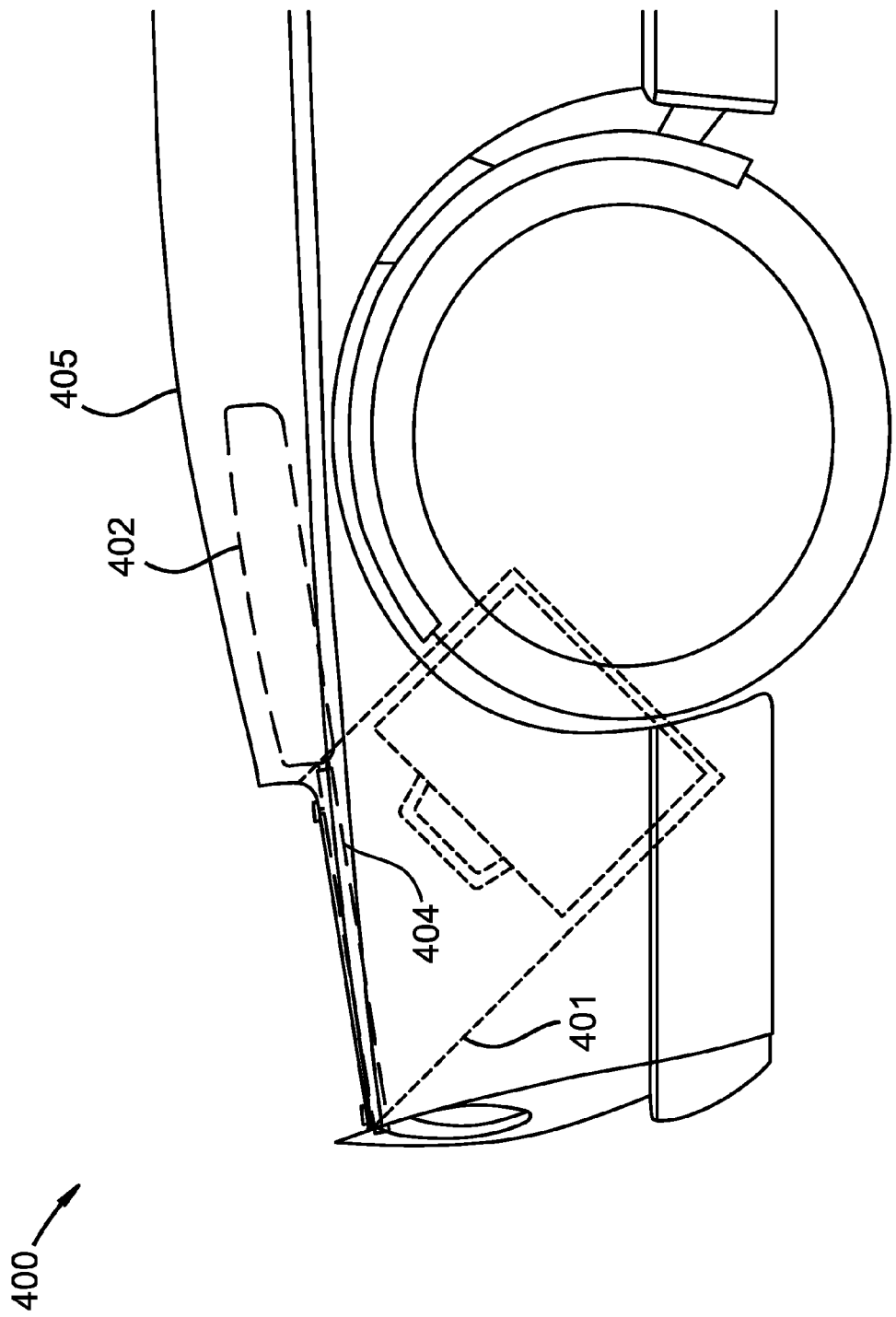

In some embodiments of system 400, such as that depicted in FIG. 4E, extendable mount 403 drops access mechanism 402 below a plane of vehicle body panel 405, and access mechanism 402 extends beneath vehicle body panel 405. In yet other embodiments, access mechanism 402 tilts up over compartment 401, pivoting at a side of compartment 401. To avoid the negative "hood-up" aesthetic, in some embodiments access mechanism 402 tilts in a direction parallel to the passenger compartment. This is also useful in cases where it is easiest to pull the vehicle side-ways next to an exchange station, such as in watercraft.

Figure 5A:
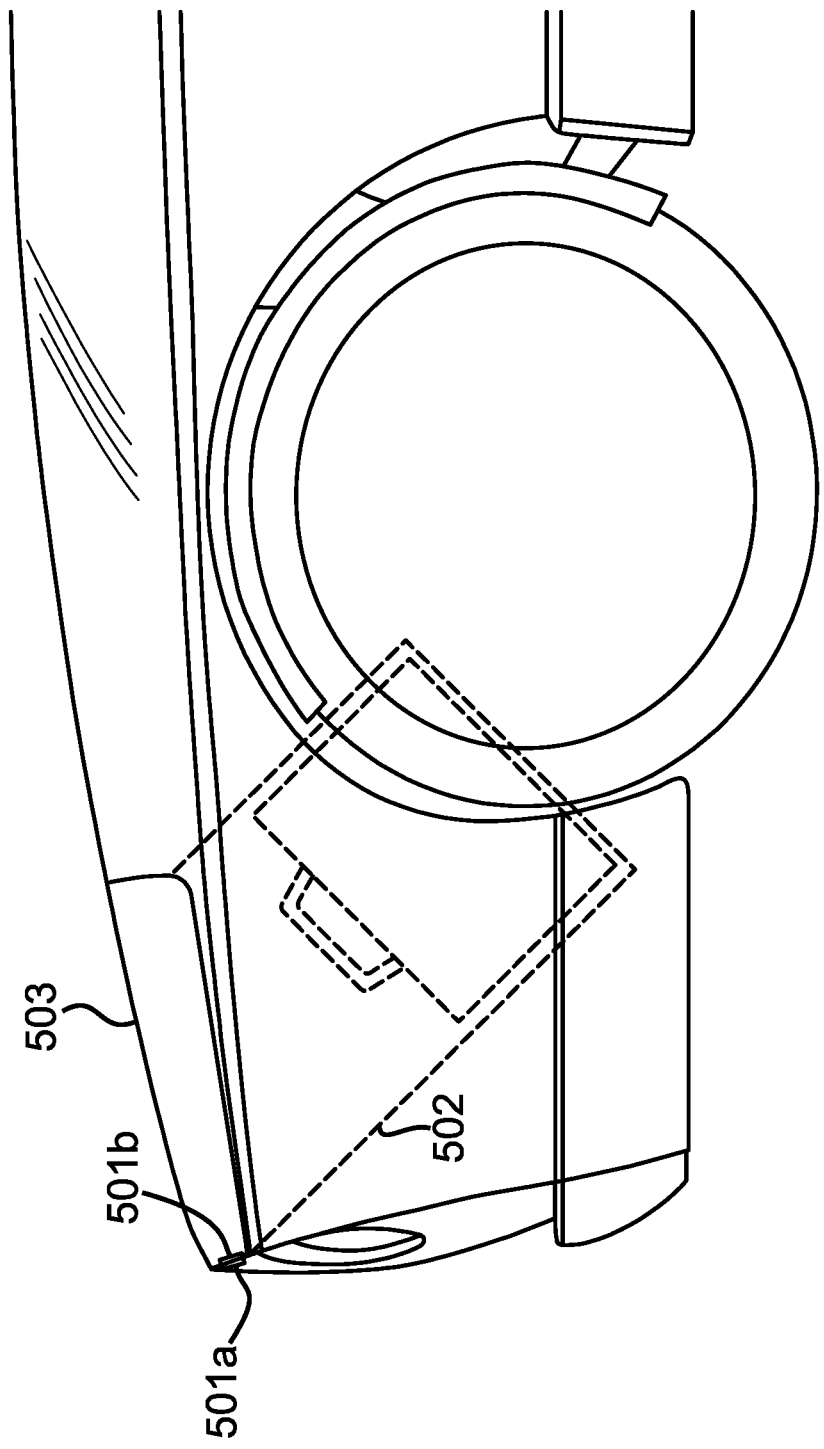
FIGS. 5A-F depict various views and embodiments of an access secure check and vehicle operation prevention mechanism, according to the claimed invention.
Figure 5B:
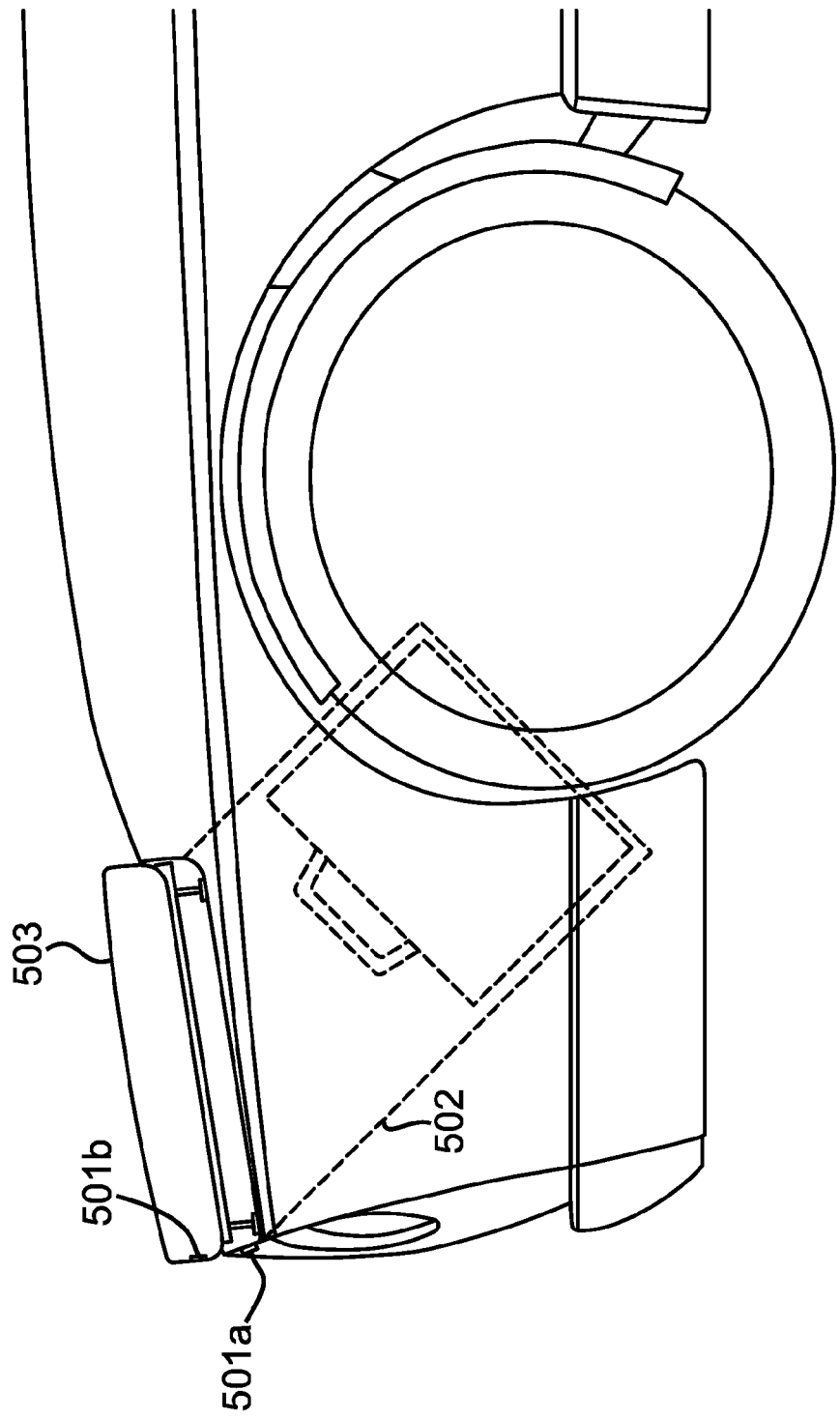

FIGS. 5A-F depict various views and embodiments of an access secure check and vehicle operation prevention mechanism, according to the claimed invention. As described above with regard to FIGS. 2A-D, the access secure check and vehicle operation prevention mechanism prevents a user from operating the vehicle when the securing mechanism incompletely, incorrectly, or incompletely and incorrectly secures the access mechanism closed. Conversely, the mechanism allows the user to operate the vehicle when the securing mechanism completely and correctly secures the access mechanism closed. The secure check mechanism includes, in some embodiments, a switch that closes when the access mechanism is closed, and completes a circuit that disables devices preventing operation of the vehicle. As shown in FIGS. 5A-B, in some embodiments, electrical contacts 501a,b are embedded in compartment 502 and access mechanism 503, respectively, such that as access mechanism 503 completely and correctly encloses compartment 502 within the vehicle, the electrical contacts complete vehicle operation prevention circuit 500, such as is depicted in FIGS. 5C-F.

Figure 5C:
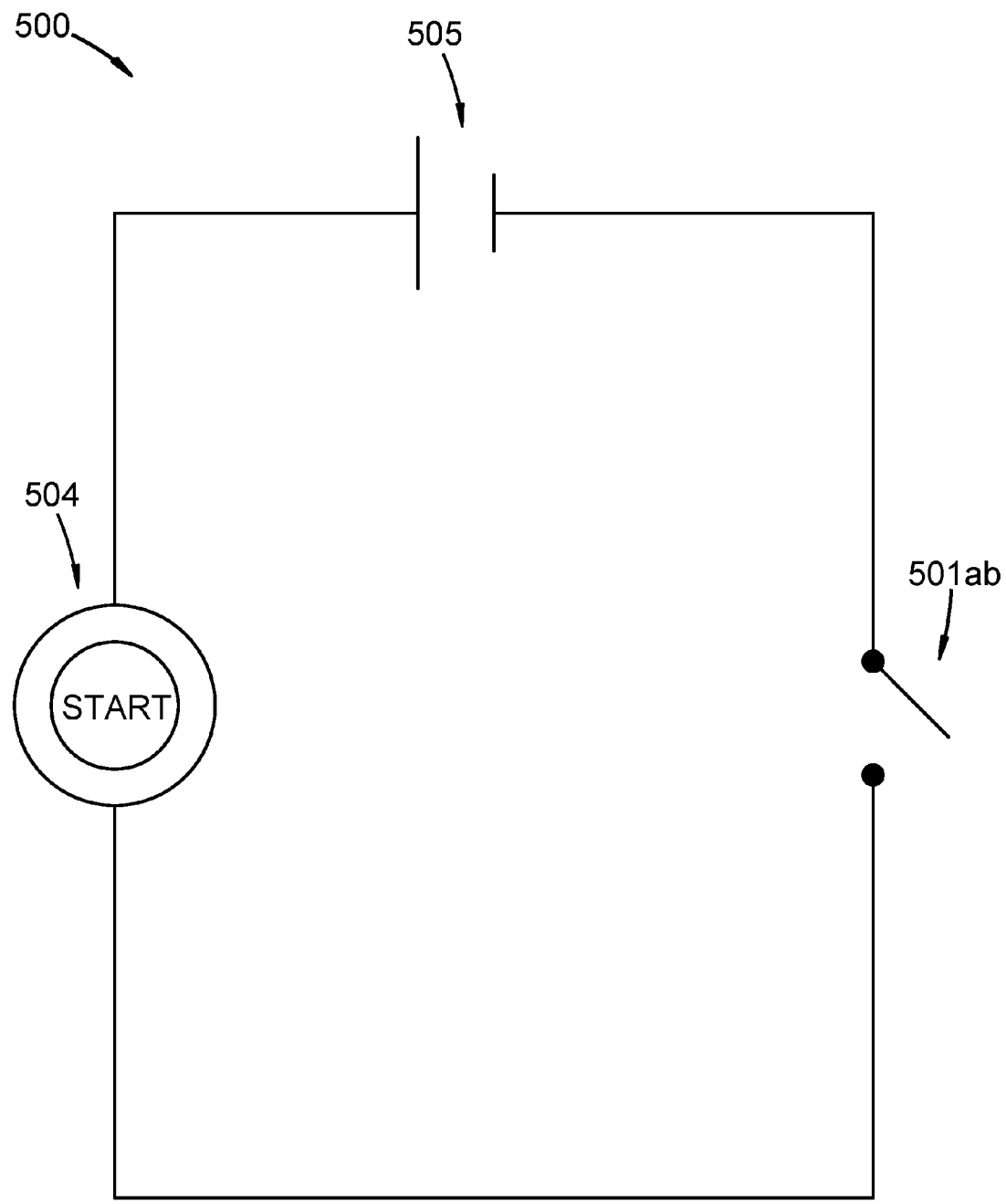
Figure 5D:
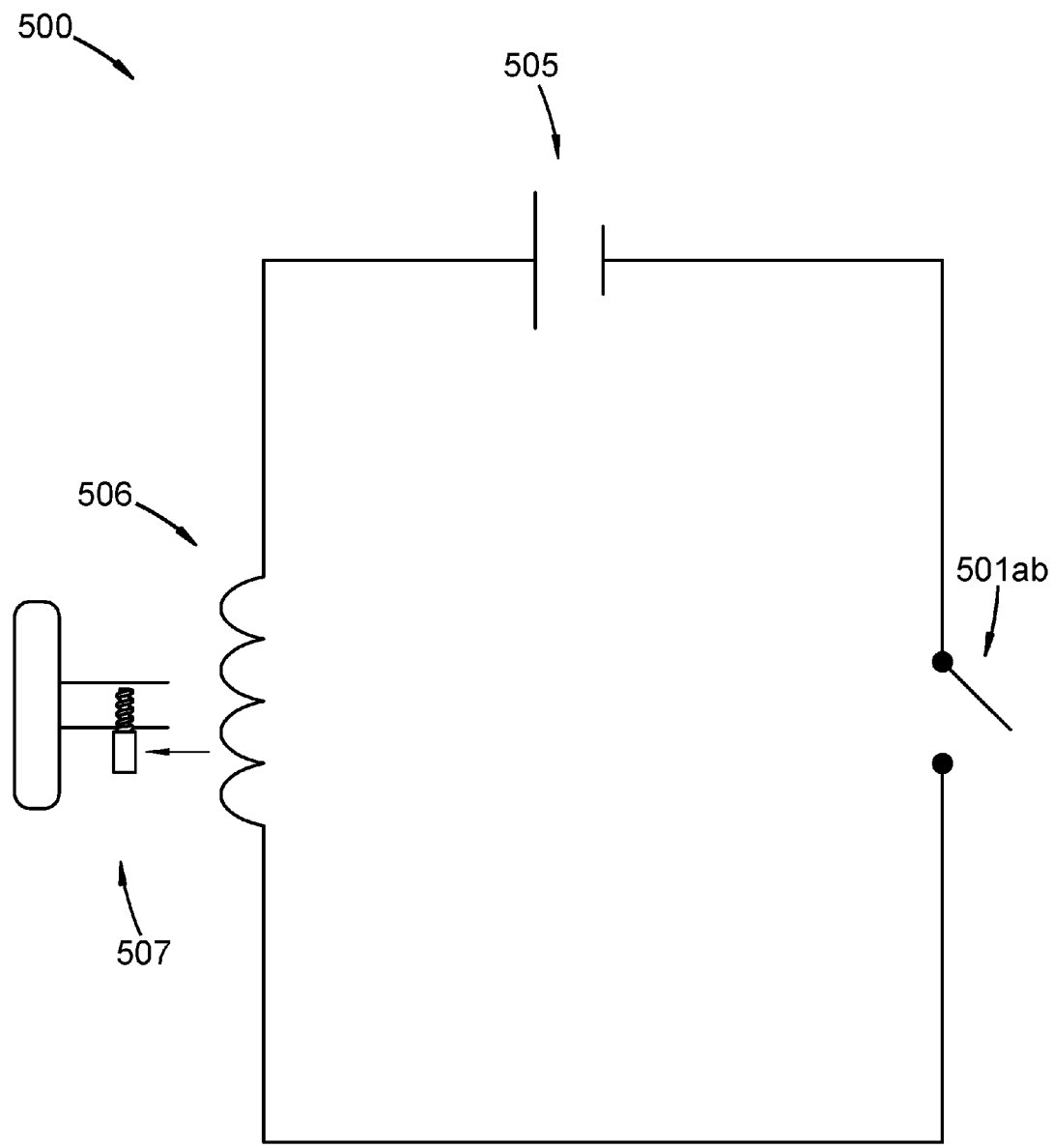
Figure 5E:
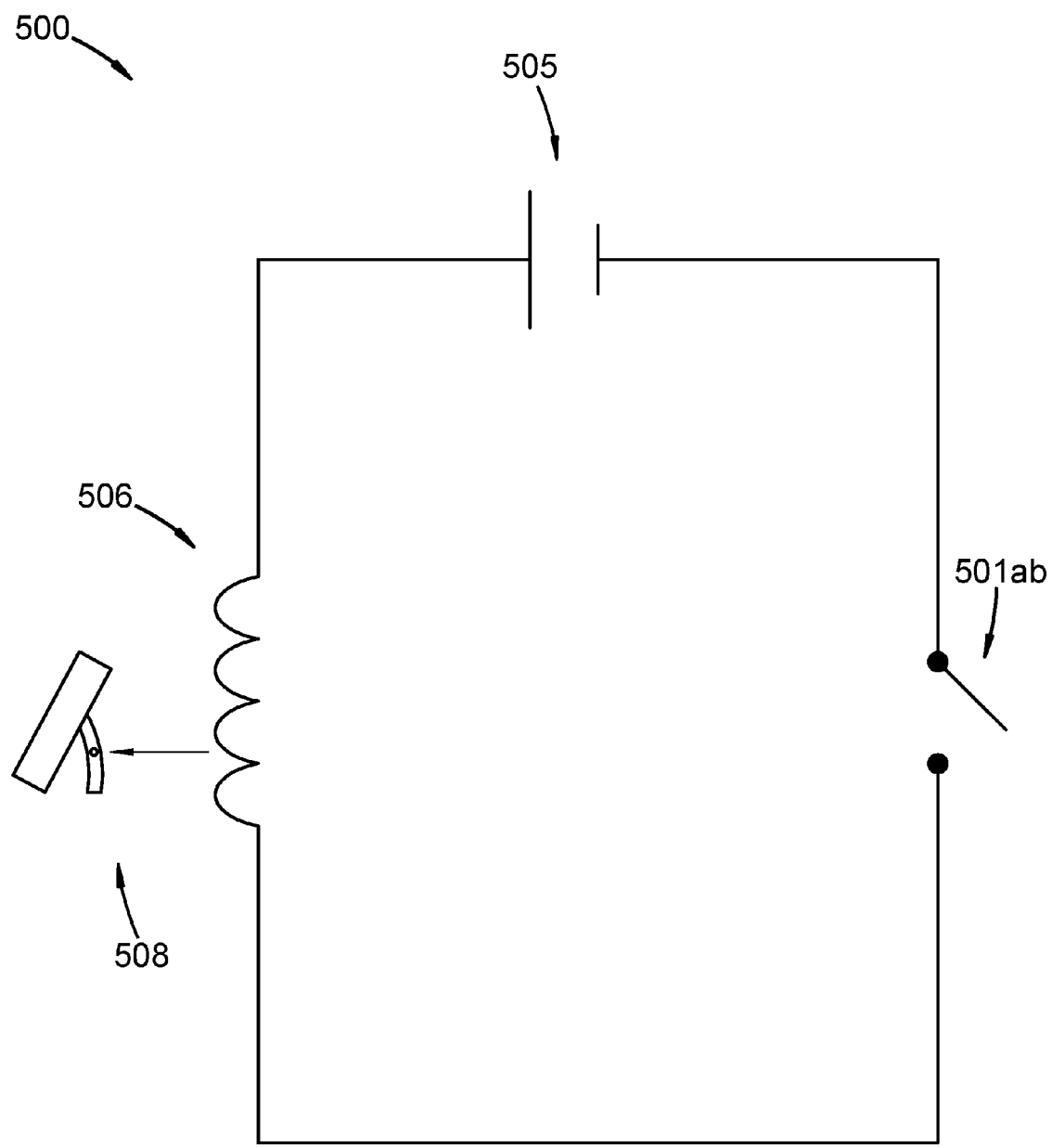
Figure 5F:
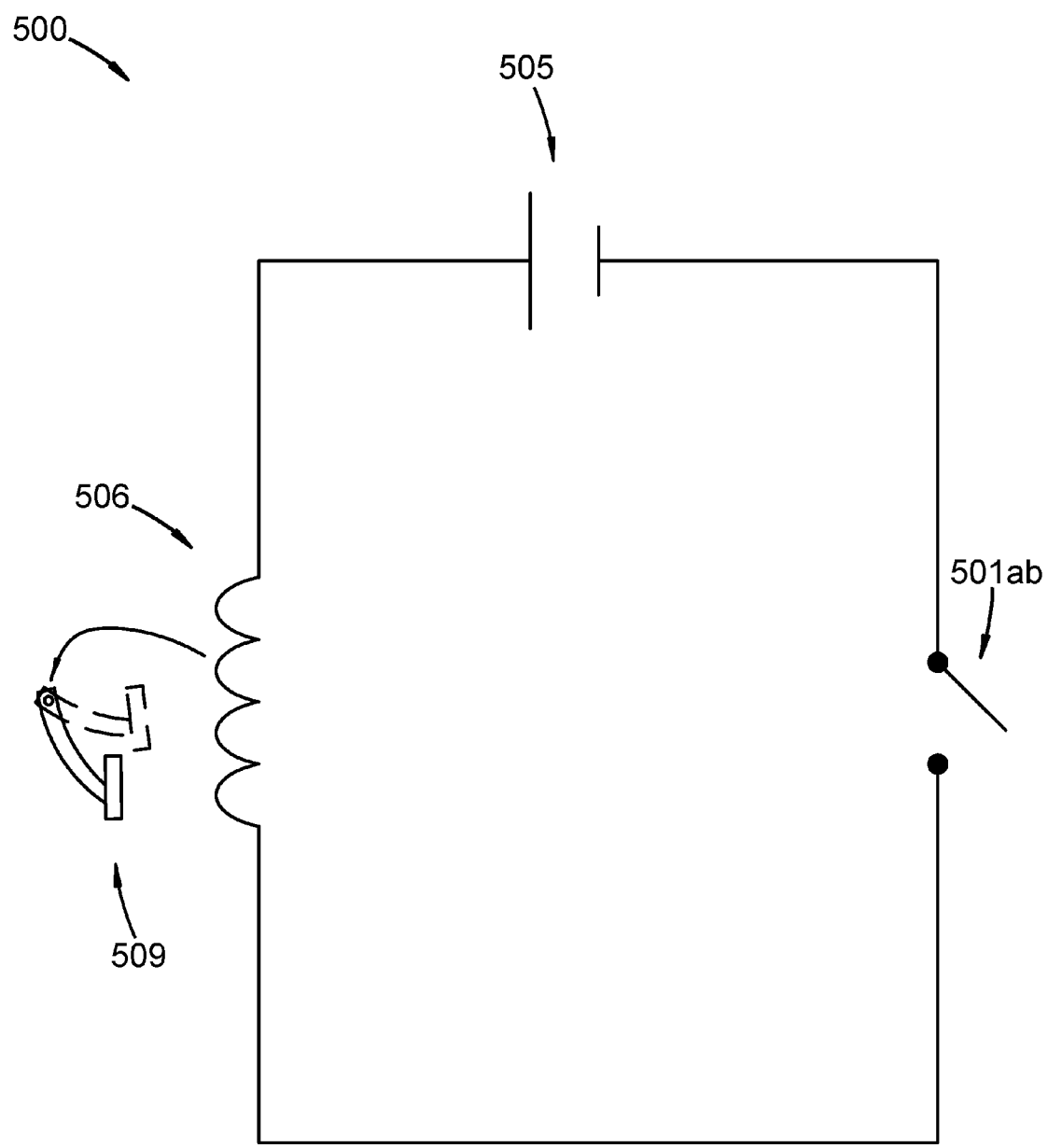

As shown in FIG. 5C, in some embodiments, the secure check mechanism prevents the user from starting the vehicle. In such embodiments, start button 504 sends an electrical signal that starts the vehicle, which signal is powered by battery 505. However, battery 505 cannot supply power to start button 504 unless electrical contacts 501a,b are closed. Similarly, in other embodiments, vehicle operation prevention circuit 500 includes solenoid 506 that locks various vehicle operation components in place, preventing the user from operating those components. For example, as depicted in FIG. 5D, solenoid 506 prevents the user from operating vehicle steering wheel 507. In other embodiments, solenoid 506 prevents the user from engaging throttle 508. In yet other embodiments, solenoid 506 prevents the user from disengaging brake system 509. In some embodiments, several solenoids 506 are included, and vehicle operation prevention circuit 500 is coupled to brake system 509, throttle 508, and/or steering wheel 507 simultaneously.

Figure 6A:
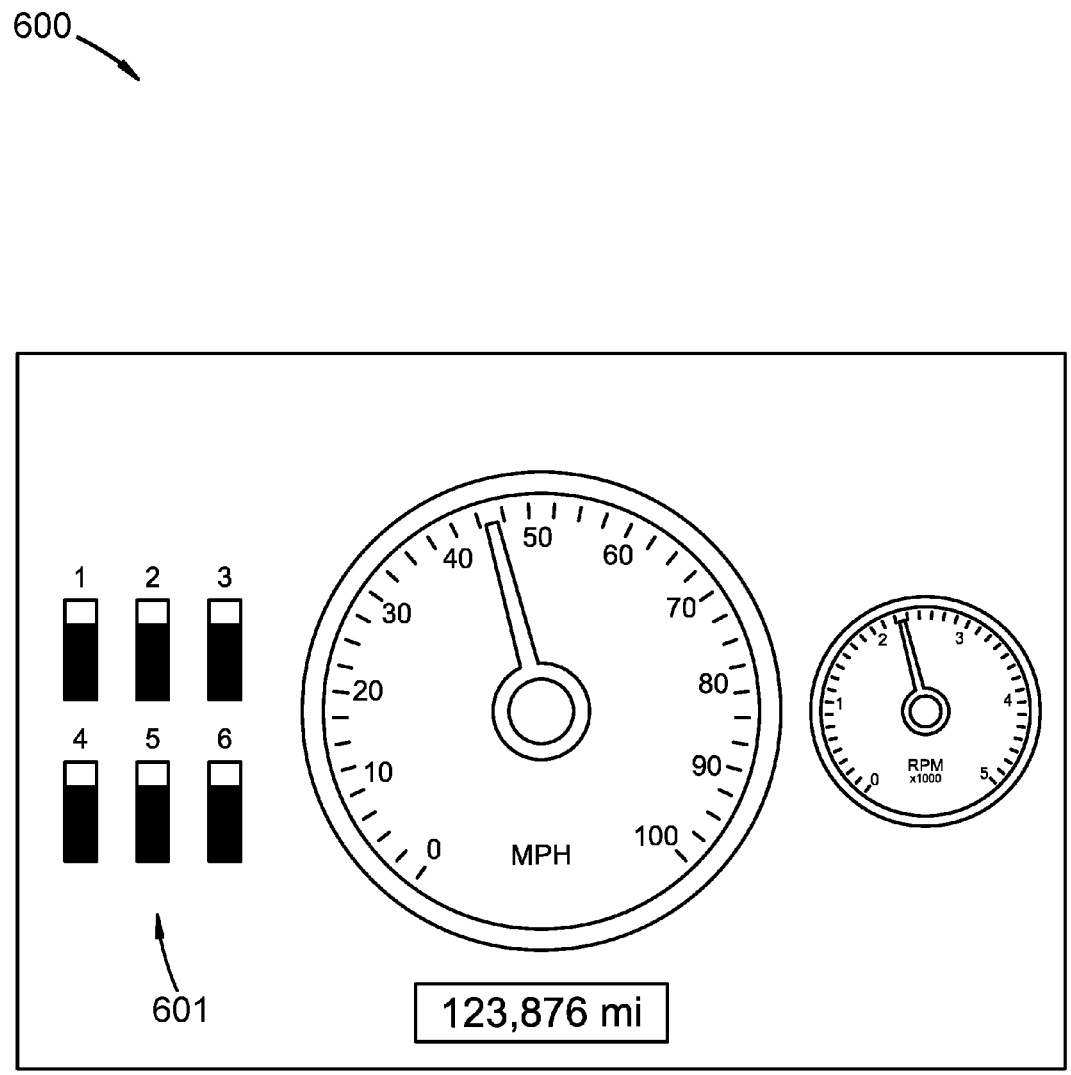
FIGS. 6A-B depict two views of a multi-cartridge system individual cartridge operability check mechanism, according to the claimed invention.
Figure 6B:
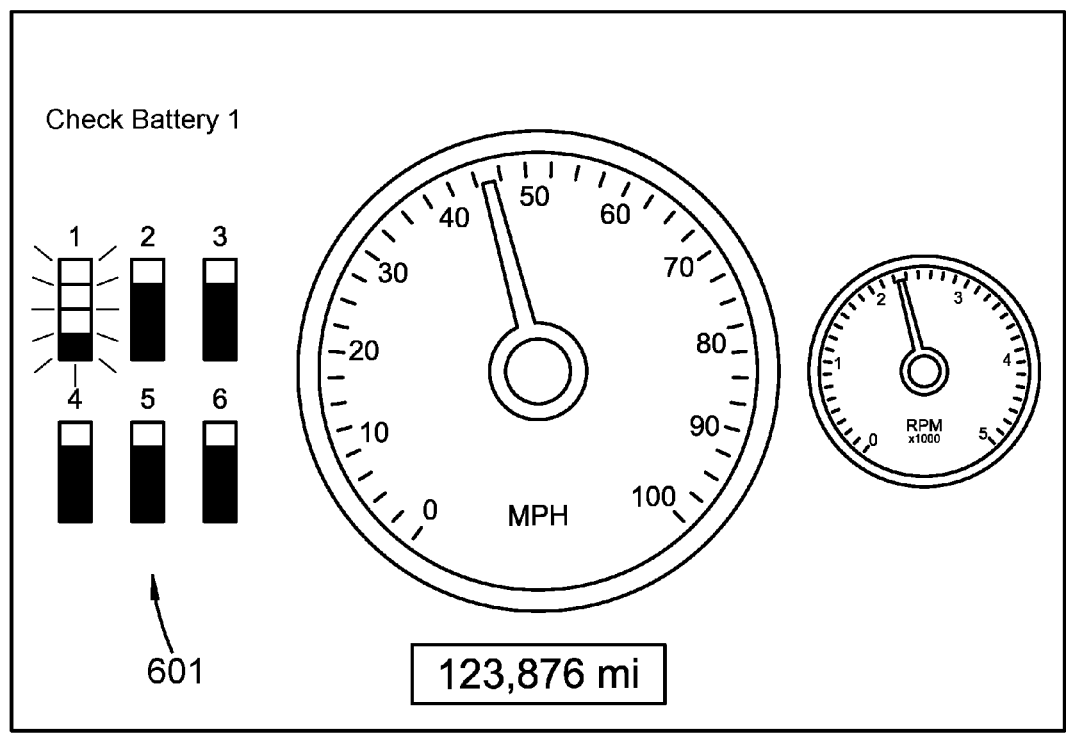

FIGS. 6A-B depict two views of a multi-cartridge system individual cartridge operability check mechanism, according to the claimed invention. As described above with regard to FIGS. 2A-D, the multi-cartridge system individual cartridge operability check mechanism indicates to a user at least one of the plurality of energy storage cartridges is incorrectly installed in the compartment, is inoperable, or both. Additionally, the mechanism indicates to the user which of the plurality of energy storage cartridges is incorrectly installed, is inoperable, or both. For example, one embodiment of the operability check mechanism includes graphical display 600 shown in FIGS. 6A-B. Display 600 includes cartridge energy level indicators 601 showing the amount of potential energy stored in each cartridge. A controller is coupled to circuitry for each individual cartridge, which circuitry measures the potential energy stored in each cartridge separately from each other cartridge. For example, in embodiments that include batteries and hydrogen fuel cells, a voltmeter is coupled separately to each cartridge. The controller reads the electric potential for each cartridge and converts that potential to a graphical display, such as graphical display 600.

We claim:

1. A vehicle energy storage system comprising:
   an energy storage compartment disposed in the vehicle and housing energy storage cartridges;
   a compartment access mechanism comprising:
      a first body panel that at least partially encloses the compartment within the vehicle; and
      one more extension mechanisms extending the first body panel away from the compartment and retracting the body panel over the compartment, thereby enclosing the compartment within the vehicle;
   an access securing mechanism securing the compartment access mechanism closed; and
   an insertion check and securing prevention mechanism comprising:
      one or more solenoids preventing the securing mechanism from securing the access mechanism when the energy cartridges are incorrectly inserted into the compartment; and
      a check circuit that is completed as the energy storage cartridges are correctly inserted into the compartment and that allows the securing mechanism to secure the access mechanism closed when the energy cartridges are correctly inserted into the compartment.

2. The vehicle energy storage system of claim 1, wherein the vehicle is a land vehicle, a watercraft, an aircraft, or combinations thereof.

3. The vehicle energy storage system of claim 1, wherein the energy storage cartridges comprise electric batteries, hydrogen fuel cells, compressed natural gas, liquid natural gas, liquid propane gas, or combinations thereof.

4. The vehicle energy storage system of claim 1, wherein the extension mechanisms comprise springs, hydraulic arms, pneumatic arms, electric cylinder arms, or combinations thereof.

5. The vehicle energy storage system of claim 1, wherein the first body panel extends away from the compartment over the vehicle parallel to a second body panel and towards a vehicle passenger compartment.

6. The vehicle energy storage system of claim 5, wherein the first body panel comprises one or more sets of rollers disposed between a first set of tracks coupled to the body panel and a second set of tracks coupled to the first set of tracks and the vehicle.

7. The vehicle energy storage system of claim 6, wherein the second set of tracks is coupled to the vehicle by one or more extendable mounts.

8. The vehicle energy storage system of claim 7, wherein the extendable mounts comprise springs, hydraulic arms, pneumatic arms, electric cylinder arms, or combinations thereof.

9. The vehicle energy storage system of claim 1, wherein the securing mechanism comprises a mechanical latch, an electromechanical latch, an electromagnetic latch, or combinations thereof.

10. The vehicle energy storage system of claim 9, wherein the latch comprises a hook-and-loop latch.

11. The vehicle energy storage system of claim 10, wherein the latch comprises one or more electromagnets and permanent magnets.

12. The vehicle energy storage system of claim 11, wherein the latch comprises the solenoid, wherein the check circuit activates the solenoid, thereby securing the access mechanism closed over the compartment.

13. The vehicle energy storage system of claim 1, wherein the compartment comprises one or more check mechanism electrical contacts separate from one or more energy transfer electrical contacts and corresponding to each of the number of energy storage cartridges, and wherein each energy storage cartridge comprises one or more complementary electrical contacts, wherein correct and complete insertion of each energy storage cartridge into the compartment places the cartridge contacts in electrical contact with the compartment contacts.

14. The vehicle energy storage system of claim 1, further comprising a check override mechanism allowing the securing mechanism to secure the access mechanism closed when fewer than the number of energy cartridges are correctly or completely inserted in the compartment.

15. The vehicle energy storage system of claim 1, wherein the check mechanism prevents securing the access mechanism when one or more of the energy storage cartridges is defective.

16. A vehicle energy storage system comprising:
an energy storage compartment disposed in the vehicle and housing a number of energy storage cartridges;
a compartment access mechanism comprising:
a moveable body panel that at least partially encloses the compartment within the vehicle; and
one more extension mechanisms extending the first body panel away from the compartment and retracting the body panel over the compartment, thereby enclosing the compartment within the vehicle;
an access securing mechanism securing the compartment access mechanism closed; and
an access secure check and vehicle operation prevention mechanism comprising:
a solenoid preventing a user from operating the vehicle when the securing mechanism incorrectly secures the access mechanism closed; and
a check circuit that is completed as the energy storage cartridges are correctly inserted into the compartment and that allows the user to operate the vehicle.

17. The vehicle energy storage system of claim 16, wherein the check mechanism prevents the user from starting the vehicle, disengaging a vehicle brake system, engaging a vehicle throttle, operating a vehicle steering wheel, or combinations thereof.

18. A vehicle energy storage system comprising:
an energy storage compartment disposed in the vehicle and housing a plurality of energy storage cartridges; and
a multi-cartridge system individual cartridge operability check circuit indicating to a user at least one of the plurality of energy storage cartridges is incorrectly installed in the compartment, is inoperable, or both, and indicating to the user which of the plurality of energy storage cartridges is incorrectly installed, is inoperable, or both.

19. The vehicle energy storage system of claim 18, further comprising a graphical display displaying an amount of potential energy stored in each of the plurality of energy storage cartridges.

20. The vehicle energy storage system of claim 18, the multi-cartridge system individual cartridge operability check circuit further comprising voltmeters coupled separately to each of the plurality of energy storage cartridges.

* * * * *